United States Patent [19]

Tucker et al.

[11] Patent Number: 5,540,173
[45] Date of Patent: Jul. 30, 1996

[54] COMPOSITE AND FAIRWATER STRUCTURES FOR MARINE VESSELS

[75] Inventors: W. Randall Tucker, Oberlin, Ohio; Gary M. Rafferty; Dean T. Dutton, both of Jacksonville, Fla.

[73] Assignee: The BF Goodrich Company, Akron, Ohio

[21] Appl. No.: 205,863

[22] Filed: Mar. 3, 1994

Related U.S. Application Data

[60] Division of Ser. No. 995,901, Dec. 18, 1992, Pat. No. 5,292,270, which is a continuation-in-part of Ser. No. 739,003, Aug. 1, 1991, abandoned.

[51] Int. Cl.⁶ .................................................... B63H 20/32
[52] U.S. Cl. ........................ 114/270; 114/357; 440/112; 440/82
[58] Field of Search .................. 114/270, 67 R, 114/357; 384/97, 98; 440/88, 89, 82, 112, 52; 248/640

[56] References Cited

U.S. PATENT DOCUMENTS

| | | | |
|---|---|---|---|
| 3,455,613 | 7/1969 | McGrath | 384/97 |
| 3,515,449 | 6/1970 | Harbage, Jr. | 384/97 |
| 5,228,876 | 7/1993 | Woods | 440/112 |

*Primary Examiner*—Jesus D. Sotelo
*Attorney, Agent, or Firm*—Richard A. Romanchik

[57] ABSTRACT

In a marine vessel having a drive shaft that extend rearwardly from its hull, wherein the drive shaft has a coupling and a bearing assembly along its length that are supported by struts, which struts are also secured to the hull of the vessel. A coupling cover encompasses the coupling and is mounted adjacent to a bearing assembly. A fairwater encompasses the coupling cover and is attached to the bearing assembly or the strut associated therewith to define a chamber and a clearance space between the fairwater and the coupling cover for directing fluids therethrough and through the bearing assembly to lubricate such bearing assembly. Vanes are located on the coupling cover or on a separate support located within such chamber to enhance the fluid flow through the bearing assembly. A laminate for use in the structures of such coupling cover; the fairwater, struts, vanes and supports wherein the laminate includes a fiber-reinforced toughened epoxy resin layer sandwiched between a vibration-damping elastomer layer and a biocidal elastomer layer. The marine laminate material can be shaped and sized into a marine structure such as described above, and exhibits desirable marine properties including cavitation-resistance, anti-fouling and vibration damping.

6 Claims, 15 Drawing Sheets

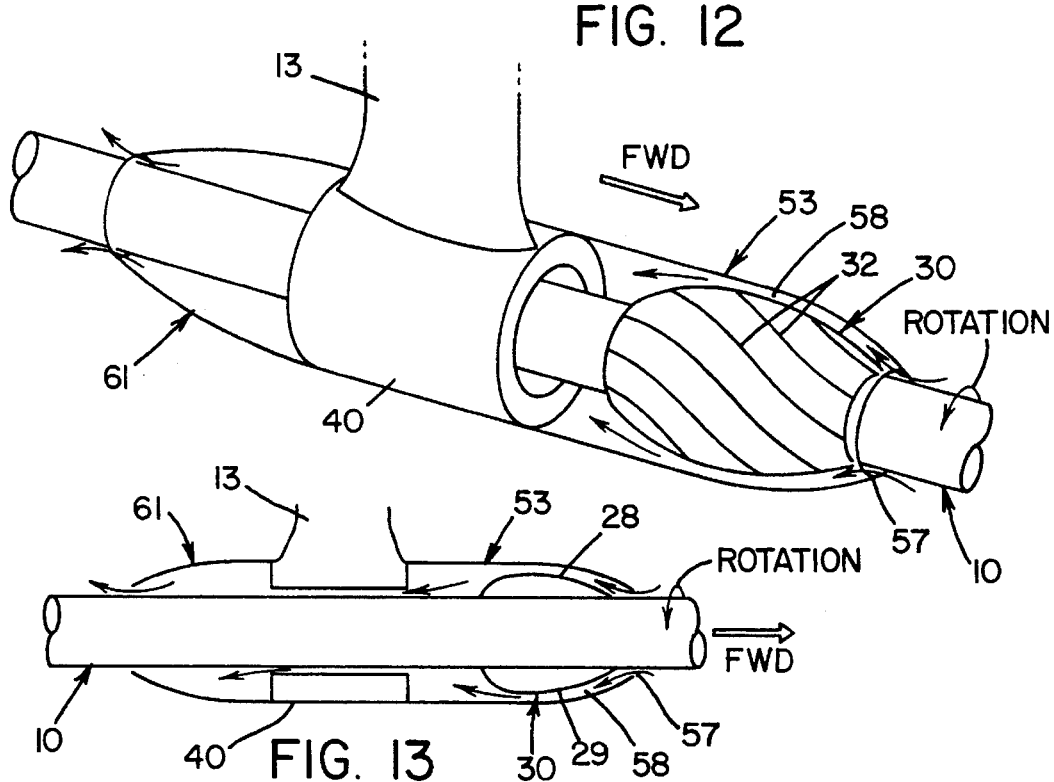
FIG. 12
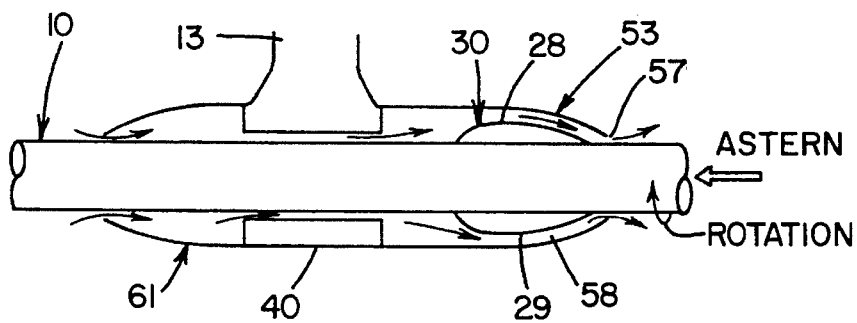
FIG. 13
FIG. 14
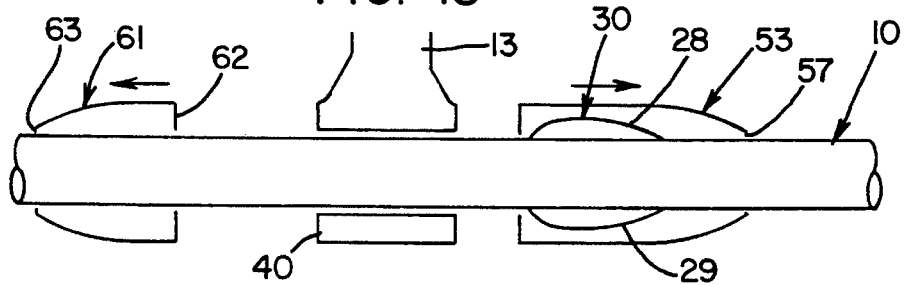
FIG. 15

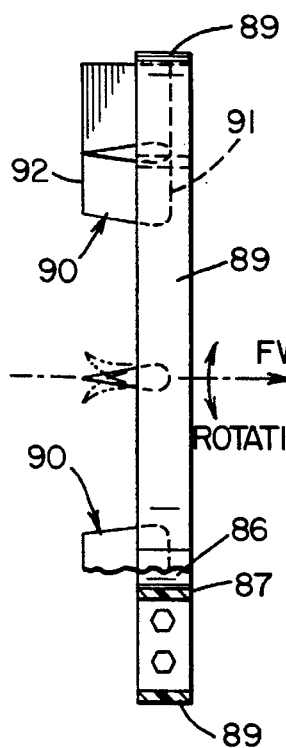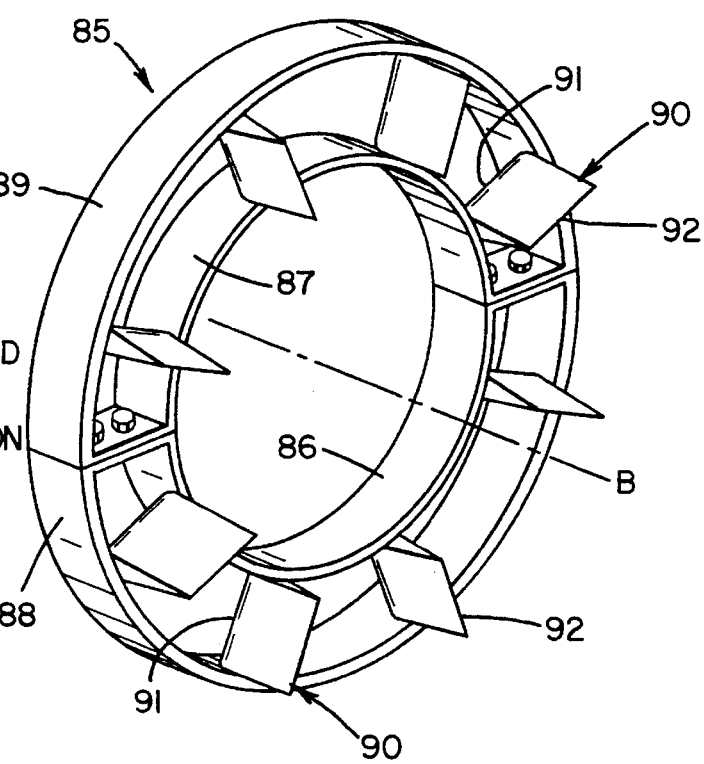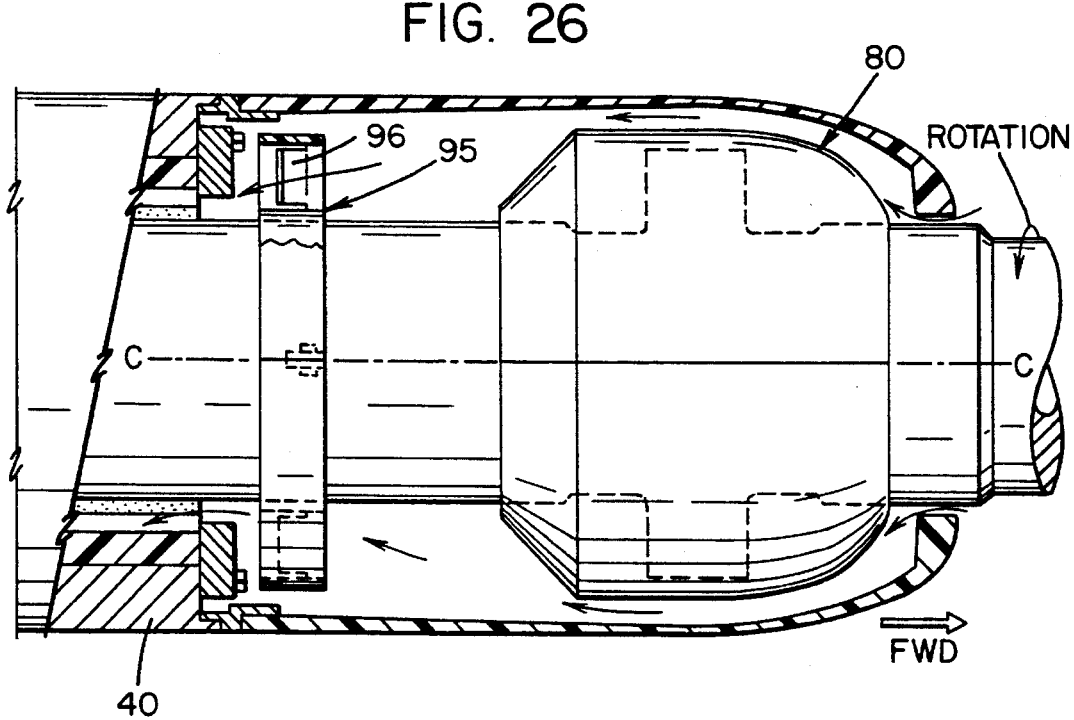

COMPOSITE AND FAIRWATER STRUCTURES FOR MARINE VESSELS

This is a divisional application of application Ser. No. 07/995,901 filed Dec. 18, 1992, now U.S. Pat. No. 5,292,270, which is a continuation-in-part of application Ser. No. 07/739,003 filed Aug. 1, 1991, now abandoned.

BACKGROUND OF THE INVENTION

This invention relates to propulsion shaft supports for marine vessels and more particularly to a new and improved means including a composite structure for fairing and protecting propeller shaft, strut barrels, and its bearings in a marine environment while providing a unique means to force lubricate and/or cool the bearings for such shaft while preventing marine-fouling and reducing vibration. The composite structure is of a laminate or sandwiched construction which is cavitation-resistant, anti-fouling and vibration-dampening. Such composite can be formed or molded into various sizes and shapes to facilitate its application to a marine environment such as underwater ship structures and the like.

The propulsion shaft of a marine vessel extends a considerable distance aft or to the stern from its exit position from such vessel or ship and requires a plurality of support points along such extension of the shaft to assure support of the shafts over hung load and stability as it rotates. On many vessels there may be up to three or four support points along its entire length that need support.

The conventional strut supports for supporting the bearings and the coupling of the rotating shaft would include a metal housing or fairwater that encompasses these elements. The metal housing has a vertical extending support or strut whose upper portions is suitably connected to the vessel framework to provide stability to the support structure. Typically, the fairwater structure and strut supports are metallic in nature wherein such housings or fairwater structures are two hemispheres that are clamped onto the coupling of the drive shaft while desirably having a hydrodynamically balanced shape to reduce turbulence in that area. Such housings, as a practical matter, since in dealing with metal, take the shapes of cylinders and portions of spheres to enhance their handling and manufacture. Considerable shaping and welding and rewelding is required in the manufacture of such housings, which in effect are not ideally hydrodynamic in shape.

The present invention solves these problems and provides other advantages by providing a composite structure that can be molded into optimal hydrodynamic shapes while insuring durability. Further a cover or casing is attached to the drive shaft forwardly of the bearing structure with pumping vanes mounted thereon. The fairwater structure is then mounted over such cover and attached to the bearing housing to provide a clearance space therebetween so that as the drive shaft is rotated, the vanes will force water through the bearing structure to cool the shaft while providing lubricant to the bearing. In addition, such combination of the cover, pumping vanes and fairwater structure can be used on a coupling that joins axially aligned drive shafts for the propeller to enhance the hydrodynamic flow of water thereover and therethrough. In addition, such fairwater structure enhances serviceability while insuring the forced flow of the surrounding fluids through the bearing structure even when the drive shaft is at an idle speed and the propeller blades are feathered.

SUMMARY OF THE INVENTION

The invention is directed to a bearing assembly and a coupling for a drive shaft of a marine vessel wherein the coupling has a coupling cover encompassing it and secured to the shaft with a fairwater further encompassing the coupling cover and secured to the bearing assembly. A plurality of vanes are either mounted on the coupling cover or on a separate support that is attached to the shaft between the coupling cover and the bearing assembly to direct the flow of fluids along the clearance space between the coupling cover and the fairwater to lubricate the staves in the bearing assembly.

The housings of the bearing assembly, the coupling cover, the vanes and related accessories are molded from the new and improved composite to provide an impact and abrasion resistant, corrosion and cavitation-resistant, anti-fouling, self-dampening, light weight parts. This permits repair and easy removing of the parts under water.

It is an object of this invention to provide a marine composite that is formable into a variety of standardized sizes and shapes.

A further object of this invention is to provide a marine composite which can be efficiently and economically manufactured.

BRIEF DESCRIPTION OF THE DRAWINGS

FIG. 12 is a schematic perspective view illustrating the flow of water between the coupling cover and outer shell through the bearing assembly that is supported by a strut;

FIG. 13 is a diagrammatic view of the bearing assembly and covers showing the water flow with the shaft rotating counterclockwise;

FIG. 14 is a diagrammatic view of the bearing assembly and covers showing the water flow with the shaft rotating clockwise;

FIG. 15 is a diagrammatic view of the bearing assembly as supported by a strut with the respective covers moved axially away from the bearing assembly for inspection and maintenance thereof;

FIG. 24 is a side elevational view of an annular vane support as shown in FIG. 23 illustrating the flexibility of the vane in response to a change in the drive shaft's rotation;

FIG. 25 is a perspective view of the annular vane support and the vanes mounted therein as depicted by FIG. 21;

FIG. 26 is a side elevational view of a modified pumping vane on a separate annular support as shown in FIG. 21;

DETAILED DESCRIPTION

Figure 1:
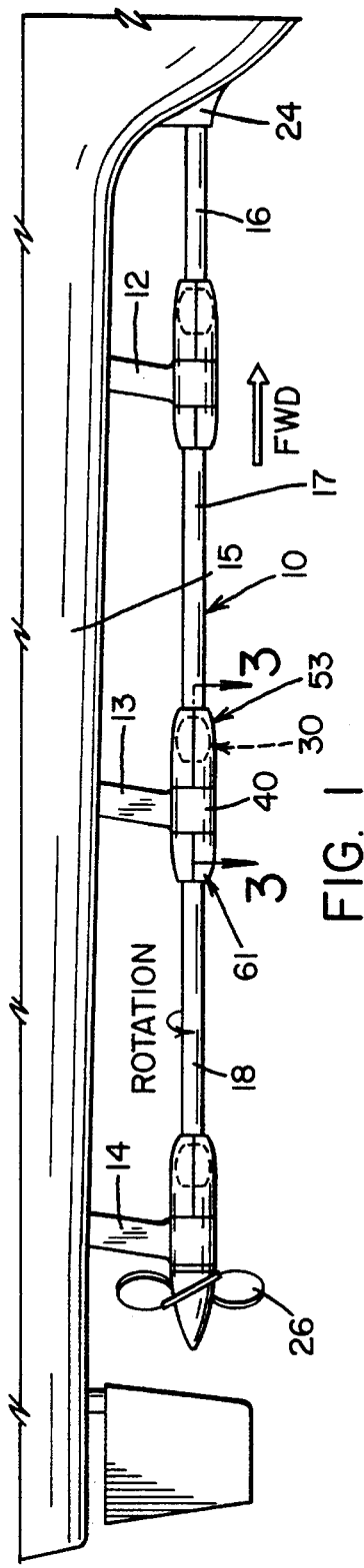
FIG. 1 is a side elevational view of the lower stern portion of a marine vessel having a propeller shaft and shaft support means.
Figure 2:
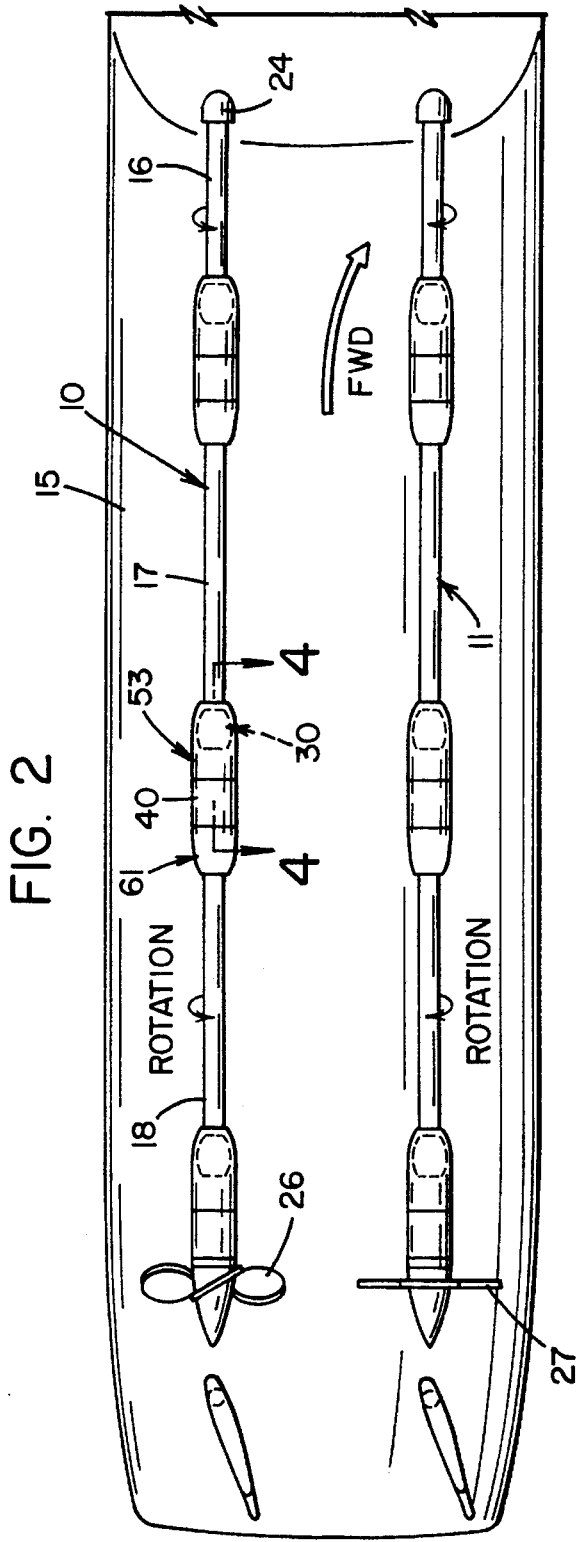
FIG. 2 is a bottom plan view of the lower stern portion of the marine vessel in FIG. 1 showing dual drive shafts with their propellers.
Figure 5:
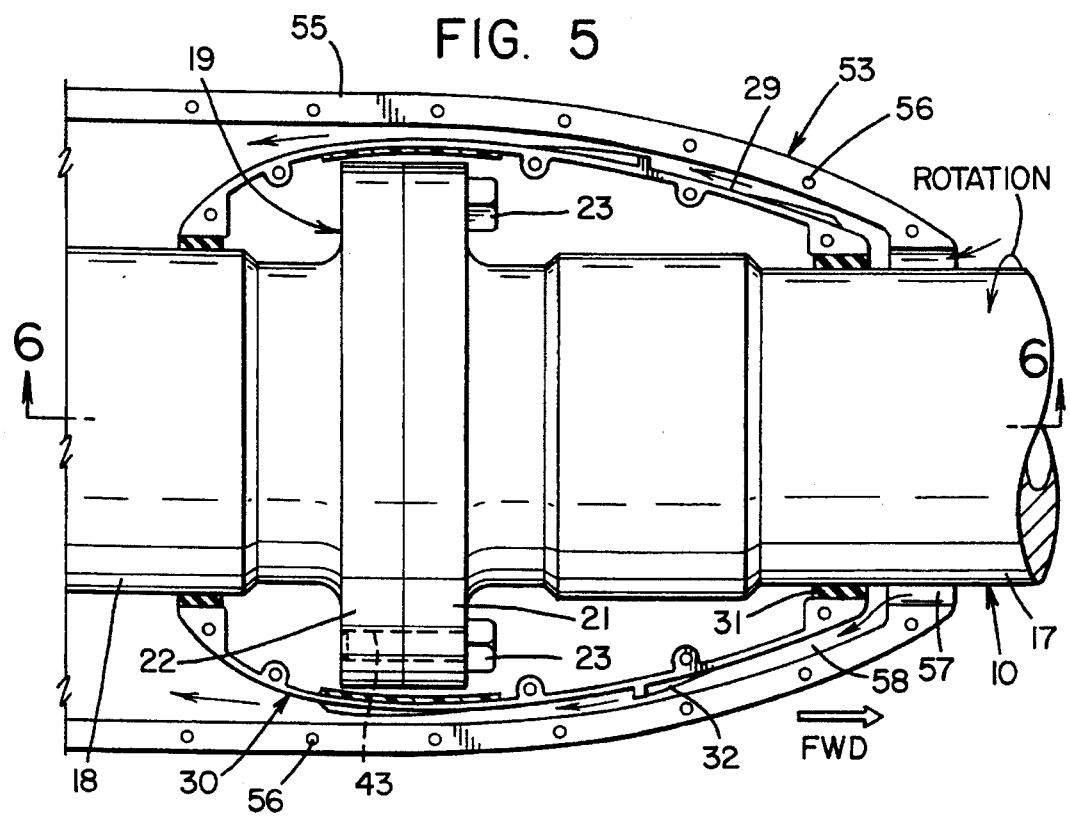
FIG. 5 is a plan cross-sectional view of the coupling cover and the outer shell taken on line 5—5 of FIG. 4.

Referring now to the drawings, wherein like reference numerals designate like or corresponding parts throughout the several views, there is shown in FIGS. 1 and 2 a pair of longitudinally extending propeller shafts or drive shafts 10 and 11, each supported by brackets or struts 12–14, which struts are themselves depending from and are suitably attached to ships hull 15. The shafts 10 and 11 have separate axial center lines and are similarly constructed and only shaft 10 will be described. Shaft 10 is composed of axially aligned shaft sections or drive shafts 16, 17 and 18 interconnected by couplings 19 as more specifically shown in FIGS. 3, 5 and 6. All couplings are similar and only the coupling for adjacent end portions of shafts 17 and 18 will be described. The adjacent ends of shaft sections 17 and 18 have circular flanges 21 and 22 respectively which are secured together as by bolts 23 or by other suitable means. The one exposed end portion of shaft 16 extends into the hull 15 of the ship through a suitable stuffing box 24 for connection to the engine of the ship. Each shaft 10 and 11 have variably pitched propellers 26 and 27 respectively suitably mounted on their respective ends.

Figure 3:
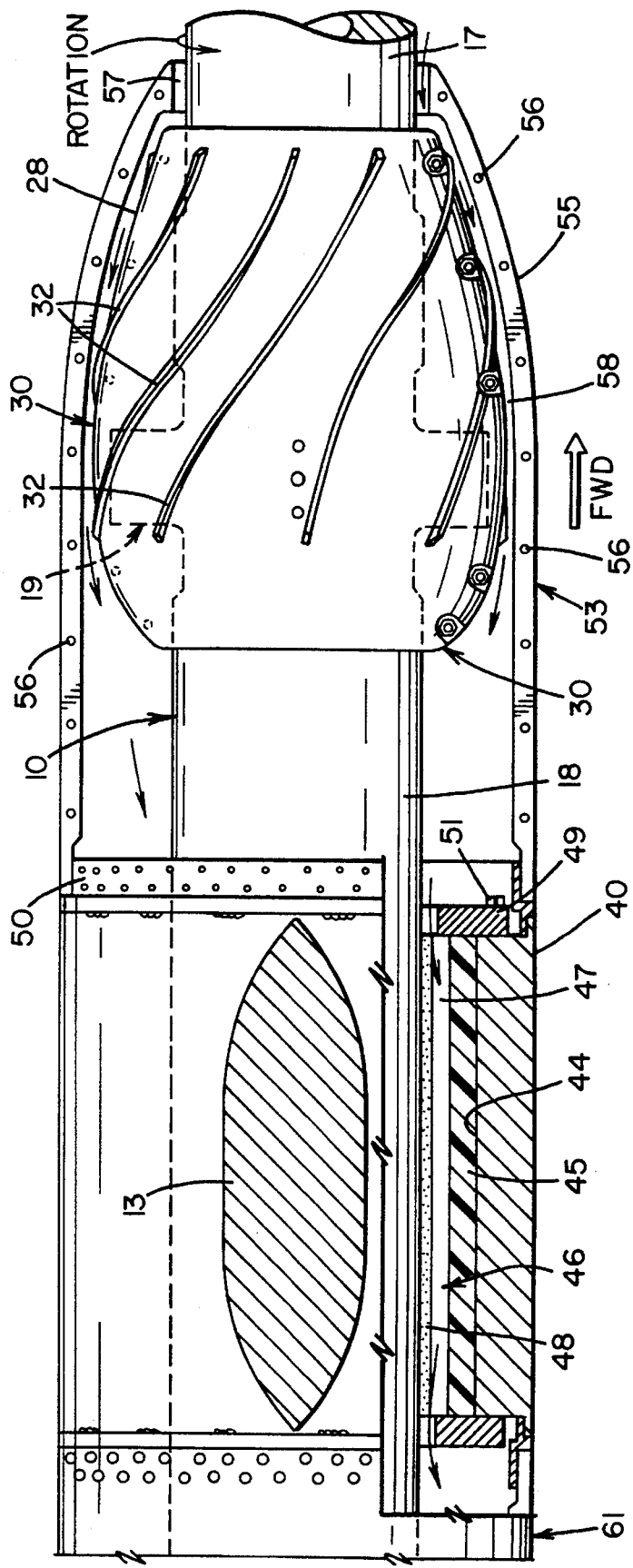
FIG. 3 is a view of a coupling for a propeller drive shaft and a coupling cover and an outer shell cover along with a bearing unit with a portion broken away to show the flow path taken on line 3—3 of FIG. 1.

The flanges 21 and 22 are covered by a pair of shell halves (FIG. 11) 28 and 29, joined together by suitable bolts. The shell halves 28 and 29 at the respective ends are recessed to closely encompass and frictionally engage shafts 17 and 18 close to the abutting ends of such shafts and their flanges 21 and 22. An annular gasket 31 may be interposed between the shaft sections 17 and 18 and the respective end portions of such shell halves 28, 29 to provide a sealed chamber to receive a suitable filler or preservative. The general contour of such joined shell halves 28 and 29 is generally ellipsoidal or oval shaped to define a support or coupling cover or casing 30. Although reference is ellipsoidal, other shapes are contemplated as discussed hereinafter. The coupling cover or housing 30 is firmly secured to the respective shaft sections 17 and 18 to rotate with them. The coupling cover has a plurality of circumferentially spaced vanes 32 mounted on the outer surface thereof in a spiral or helical path relative to the longitudinal center line or axial center line of the shaft 10. The vanes 32 are solid and can be molded with the molding of the shell halves 28 and 29 or molded separately and suitably attached to such shell halves. A vane is a thin flat or curved object that is made to rotate about an axis to cause a fluid to flow or that redirects a flow of fluid. The vanes can be helical as shown in FIG. 3 or a series of flat thin members as disclosed in FIG. 23.

Figure 4:
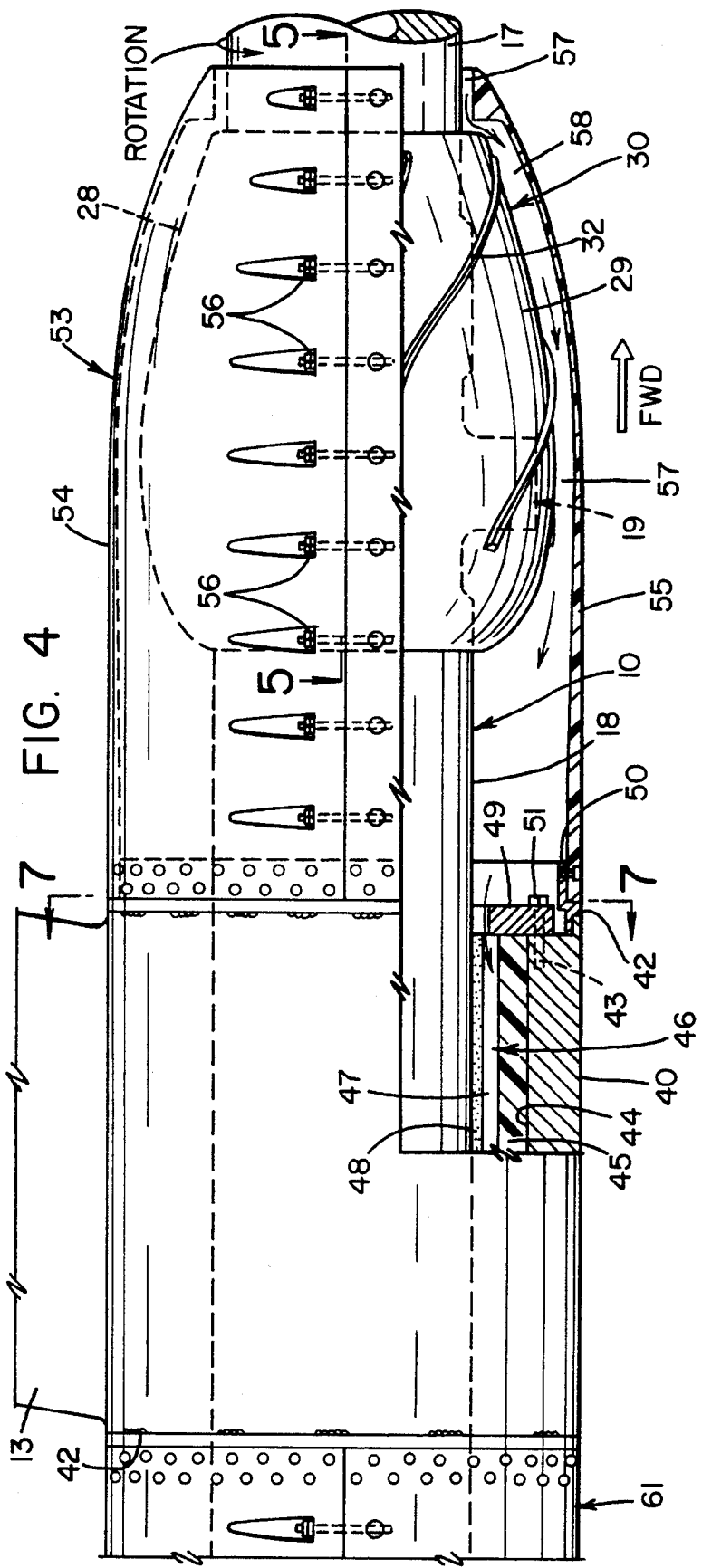
FIG. 4 is an elevational view of the coupling cover and the outer shell taken on line 4—4 of FIG. 2.

Mounted closely adjacent to the shell halves 28 and 29 is a bearing housing or strut barrel 40 supported by a strut 13. Housing or strut barrel 40 has a pair of spaced annular end surfaces 42 (FIG. 4), with threaded bores 43 extending into the housing. The housing 40 has a central opening or bore 44 with a central axis to accommodate a bearing unit to be described. The bearing unit has an outer cylindrical shell 45 which receives a plurality of circumferentially spaced bearing staves 46. Each stave 46 includes a rectangular bearing support element or backing support 47 made from a high quality non-corroding, ultra high molecular weight polyethylene. Suitably bonded to each support bearing element 47 is an elastomeric bearing element 48.

The bearing housing, the cylindrical shell 45 and the staves define a bearing assembly that is supported by the strut 13, which strut may be integral with the bearing housing or suitably attached to it.

An elastomer is defined as a substance that can be stretched at room temperatures to at least twice its original length and, after having been stretched and the stress removed, returns with force to approximately its original length in a short time (see Glossary of Terms as prepared by ASTM Committee D11 on Rubber and Rubberlike Materials published by the American Society for Testing Materials).

The elastomeric or rubber material that can be used can be any of the well known elastomers including for example natural rubber, copolymers of butadiene and acrylonitrile, copolymers of butadiene and styrene, copolymers of butadiene and alkyl acrylates, butyl rubber, olefin rubbers such as ethylene-propylene and EPDM rubber, fluorocarbon rubbers, fluorosilicone rubbers, silicone rubbers, chlorosulfonated polyethylene, polyacrylates, polybutadiene, polychloroprene and the like.

The outer shell 45 and the staves 46 are located within such central bore 44 of the housing 40 such that the respective ends abut a pair of semi-circular retainer rings 49 which are secured to the end sections of the housing 40. Rings 49 have a plurality of circumferentially spaced bores which receive bolts 51 which in turn are threaded into the respective threaded bores 43 to securely fasten the bearing units within housing 40 with the respective staves 46 surrounding and supporting the propeller shafts 10.

Figure 7:
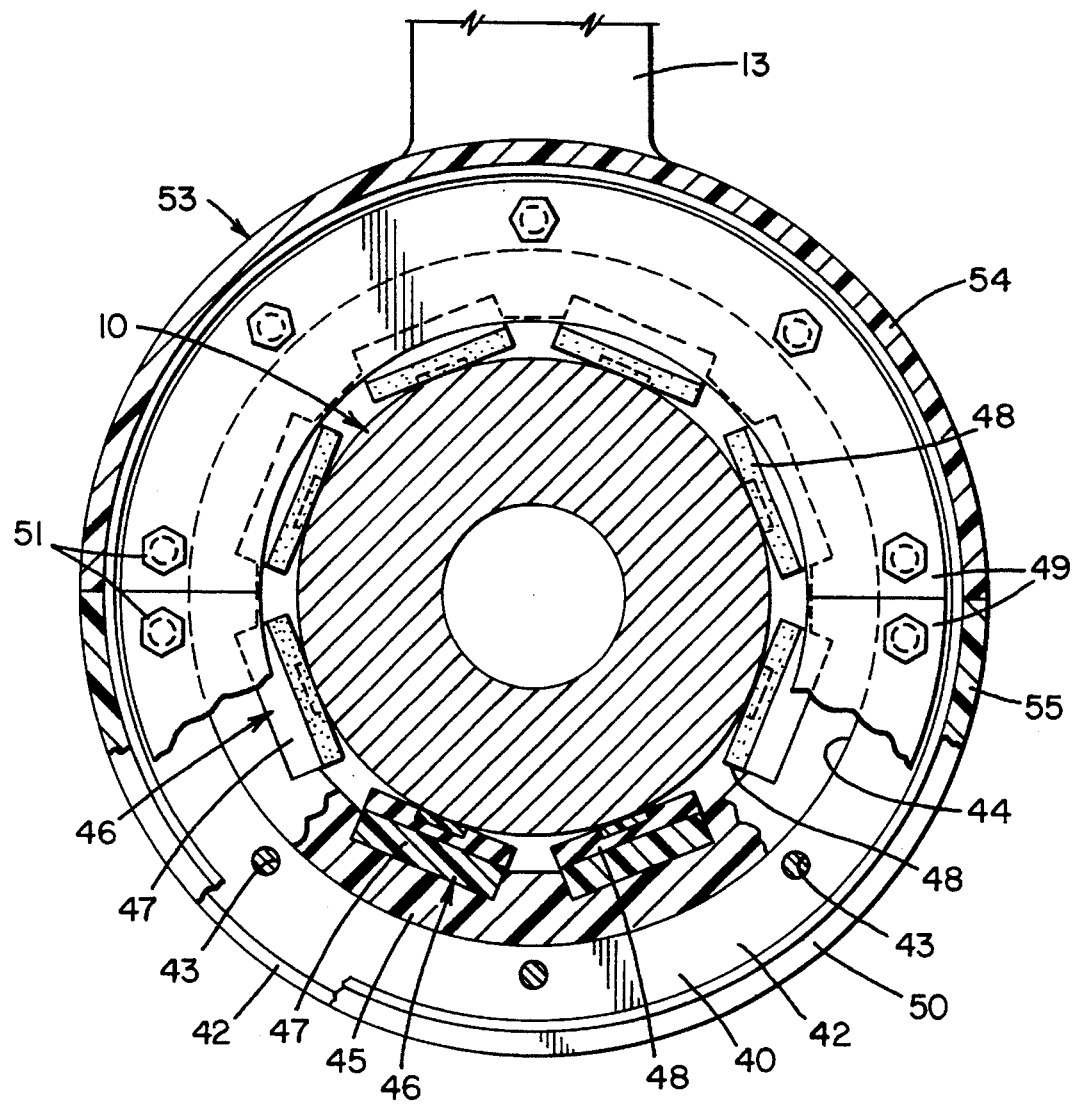
FIG. 7 is a cross-sectional view of the bearing assembly taken on line 7—7 of FIG. 4 with a portion broken away to show the bearing staves.
Figure 8:
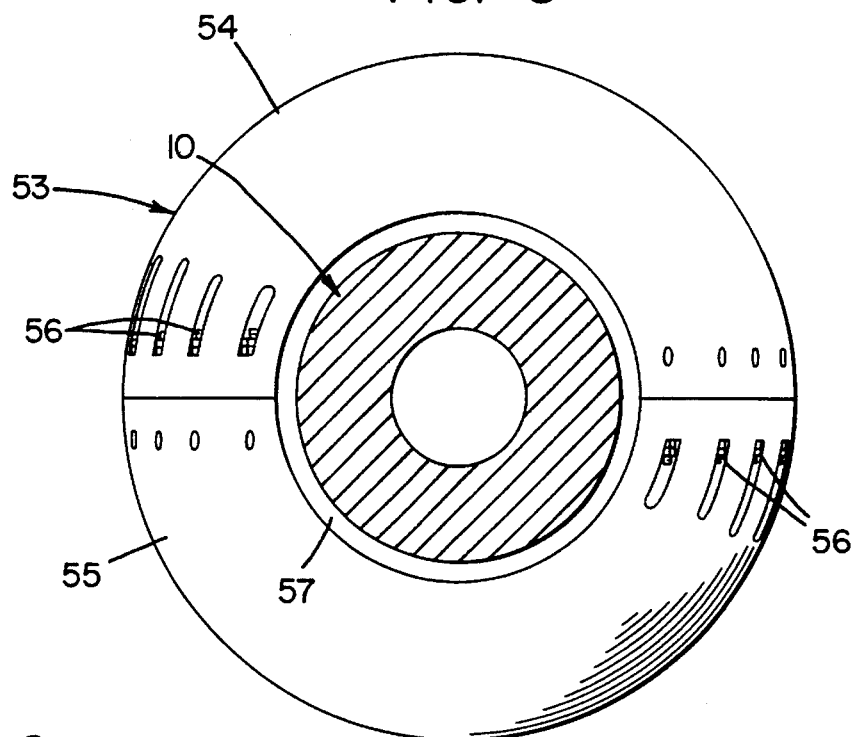
FIG. 8 is a front elevational view of the outer shell or fairwater cover taken on line 9—9 of FIG. 6.
Figure 9:
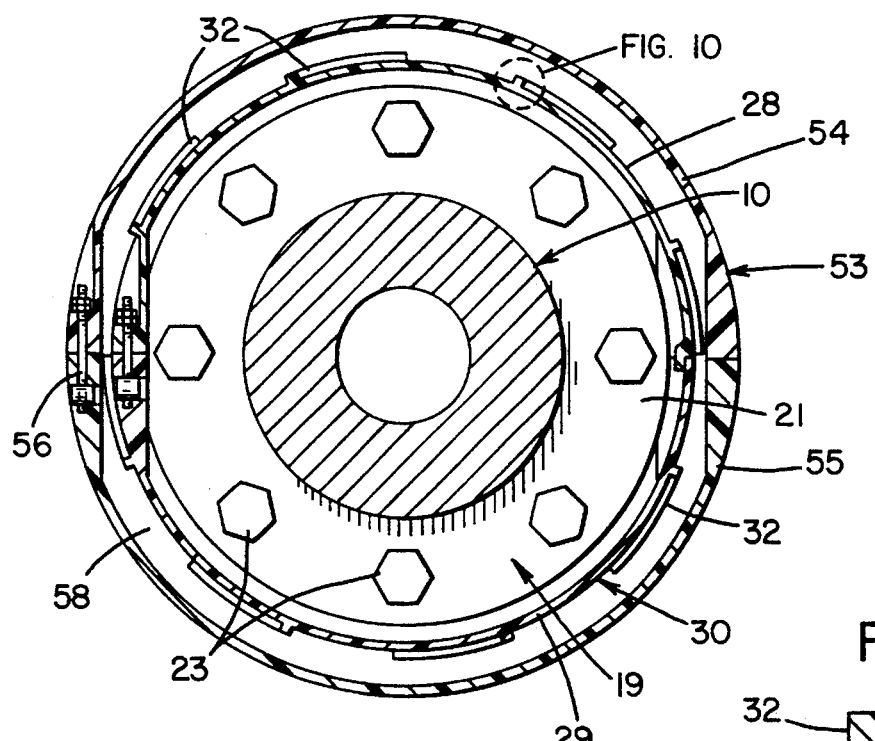
FIG. 9 is a front elevational cross-sectional view of the outer shell, coupling cover and propeller shaft taken on line 9—9 of FIG. 6.
Figure 10:
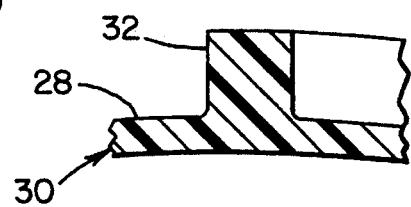
FIG. 10 is an enlarged view of a cross-sectional showing of the coupling cover and vane taken from FIG. 9.

As seen in FIG. 7, the staves 46 have a clearance space between adjacent ones defining a plurality of circumferentially spaced grooves to insure a proper flow of water for lubricating the rubber bearing surfaces as well as cool the bearing assembly. The respective staves 46 are replaceable and are easily accessible by the removal of retainer rings 49.

A metal oval shaped housing, shell, cover or fairwater nose 53 composed of two half shell sections 54 and 55 (FIGS. 1 and 4) are suitably secured together by bolts 56. The one end of fairwater nose 53 is suitably connected to the retainer ring 50 or bearing housing 40 to permit selective detachment for inspection of the bearings and maintenance thereof. The other end portion of fairwater 53 tapers downwardly over the coupling cover 30 to provide an annular clearance space 57 between such fairwater and the outer peripheral surface of shaft section 17. The general outer and inner shape or contour of fairwater 53 is to the general outer ellipsoidal shape of the coupling cover 30 as depicted by FIG. 3 to define an annular flow path 58 therebetween, which flow path is of sufficient clearance to accommodate the spiral pumping vanes 32 that are on the outer surface of coupling cover 30. Thus as the drive shaft 16 is rotated, the coupling cover 30 and the vanes 32 rotate with it drawing in water at the clearance space 57 and force pumping the water through the annular flow path 58 and forcing the water through the clearance space between adjacent bearing staves 46 to lubricate the bearing surfaces as well as to also cool the bearing assembly. Located rearwardly of the bearing housing 40 and the fairwater nose 53 is a conical shaped housing or fairwater tail 61 that is similar in contour as fairwater nose 53, however shorter in overall length. Fairwater 61 has an oval base 62 that tapers down into a smaller oval portion 63 (FIG. 15) to present a dynamically contoured housing to facilitate the smooth flow of water thereover. In a similar manner, the interior or fairwater 61 has a smooth contour that directs the flow of water away from the fairwater 53 and the bearing assembly 40 outwardly therefrom to maintain a smooth flow path.

The fairwater 53 is referred to as the fairwater nose while the fairwater 61 is referred to as the fairwater tail.

Figure 11:
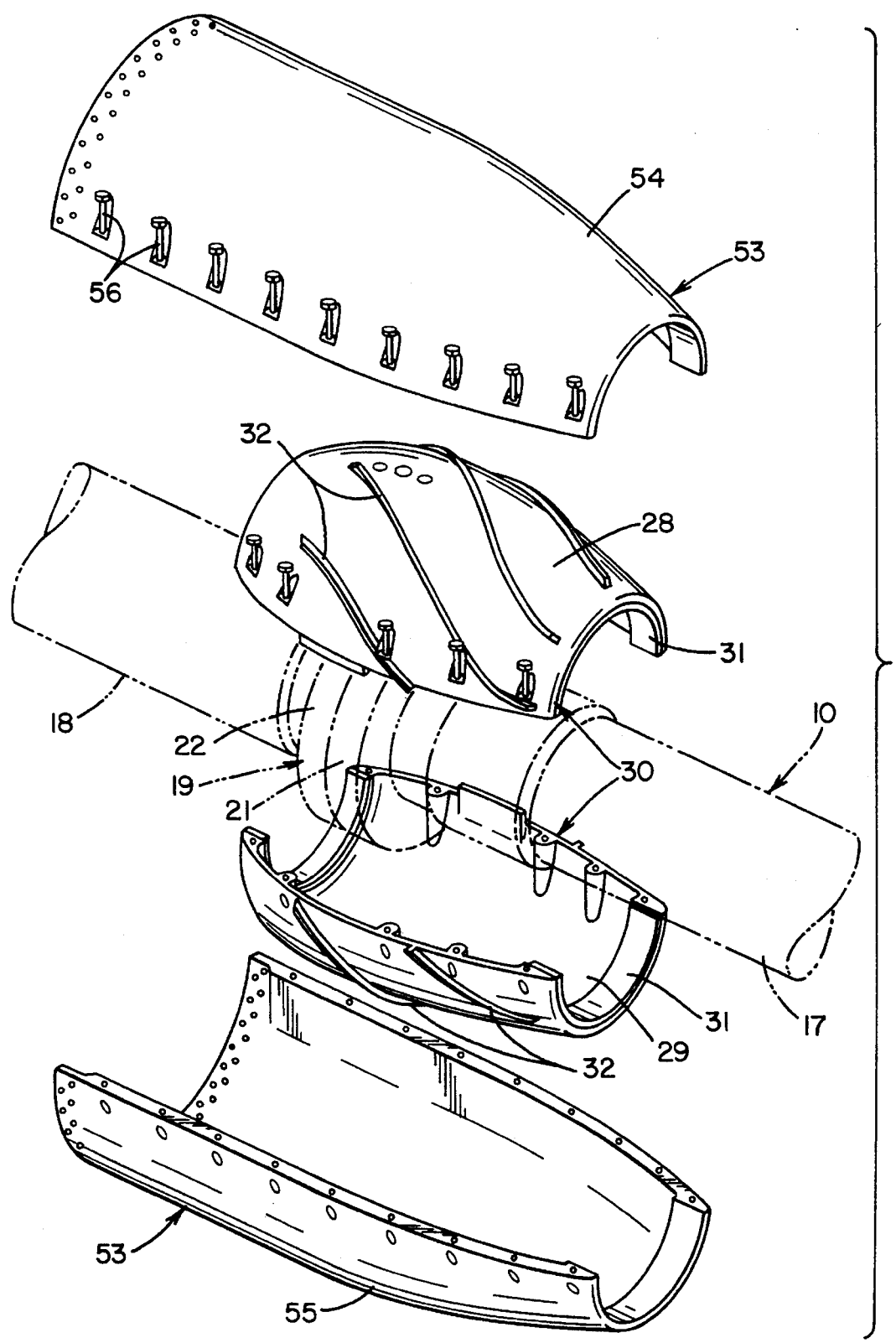
FIG. 11 is an exploded perspective view of the coupling cover with the drive shafts and coupling shown in phantom lines.

FIG. 11 discloses in phantom lines the axially aligned shaft sections 17 and 18 fastened together by a coupling 19, which coupling 19 has a pair of half shells 28 and 29 securely fastened to the shaft sections to provide a rotating coupling cover 30 with helical vanes 32 thereon, which in turn is encompassed by a fairwater 53 composed of two half shell sections 54 and 55.

Figure 16:
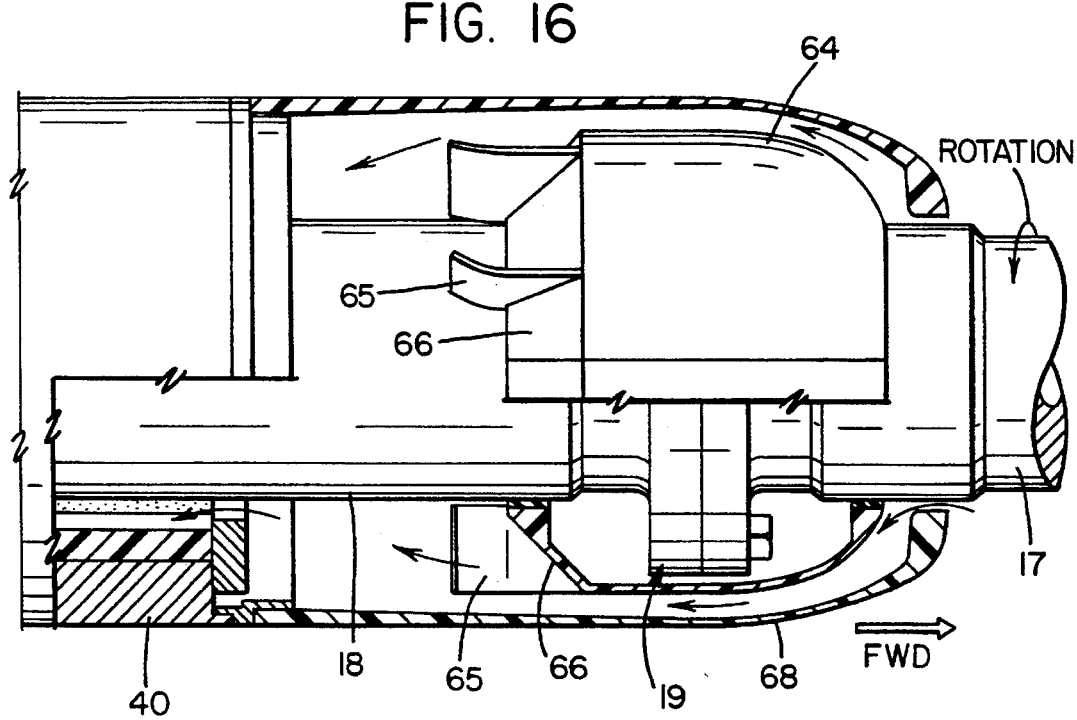
FIG. 16 is a side elevational view of a coupling cover and bearing assembly showing a modified form of pumping vanes on the coupling cover.
Figure 17:
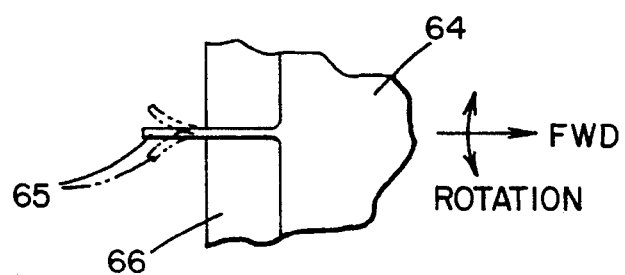
FIG. 17 is a plan view of a single vane on the coupling cover as depicted by FIG. 16.

A modification of the invention is shown in FIG. 16 which discloses a coupling cover, designated 64, having a plurality of vanes or fins 65 suitably connected to the upstream or rearwardly disposed portion of such coupling cover 64. Such fins are made from a flexible elastomeric compound to permit a slight flexing thereof in accordance with the direction of rotation of the shaft sections. In this configuration of the coupling cover 64, the cover is generally cylindrical for the major portion of its axial length and tapers sharply as at 66 on its rearward portion to closely encompass and frictionally engage the shaft sections and to be suitably secured thereto to ensure simultaneous rotation therewith. This type of arrangement of vanes or fins insures that the pumping action of the vanes or fins pumps water through the bearing assembly regardless of which direction the shaft sections are rotated. As in the first described embodiment, a fairwater or cover 68 encompasses the coupling cover 64 and is attached to the bearing assembly 40 while providing an annular clearance space between its interior surface and the coupling cover 64 while terminating at its forwardly disposed position with a clearance space around shaft section 17 to insure a proper flow of lubricant fluids. This modification as well as other modifications are described with respect to shaft sections 17 and 18 and their coupling 19 for simplicity are equally applicable to other shaft sections or to wherever a supporting strut may be required. In certain instances where a strut and bearing assembly is used to support a shaft section, a coupling cover may be used even though a coupling is absent so that the function is to provide the means for lubricating the staves of a bearing assembly.

Figure 18:
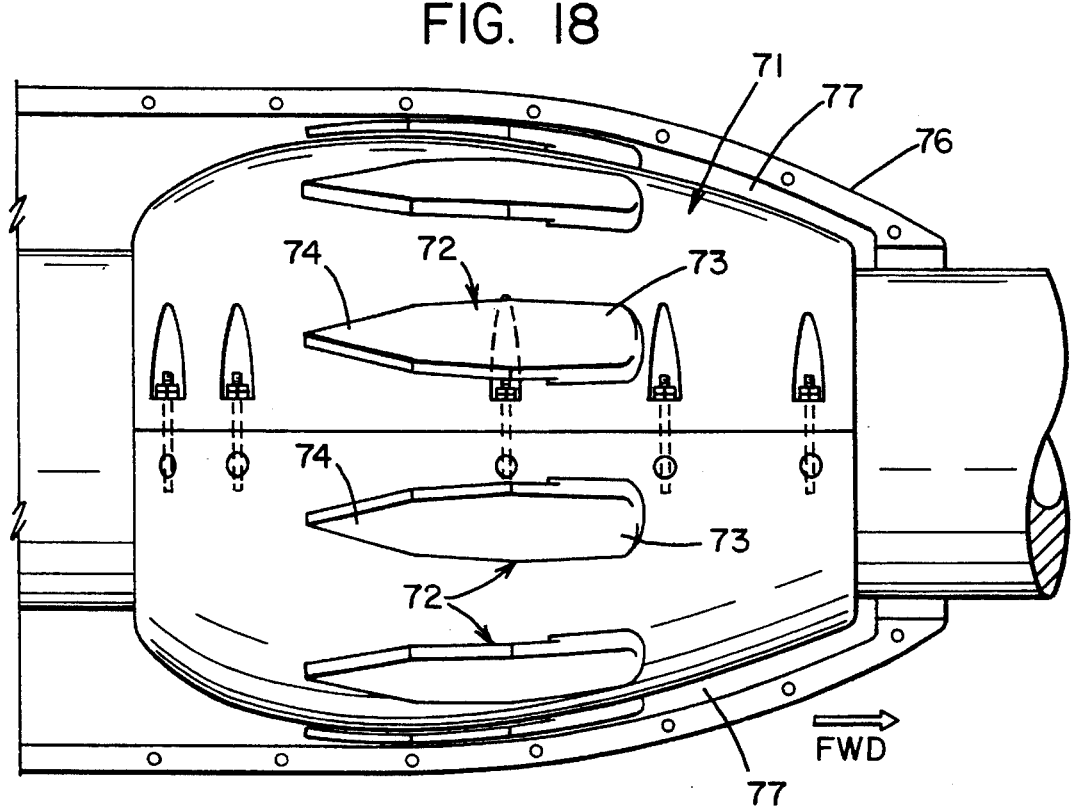
FIG. 18 is a side elevational view of a further modification of a vane on a coupling cover.
Figure 19:
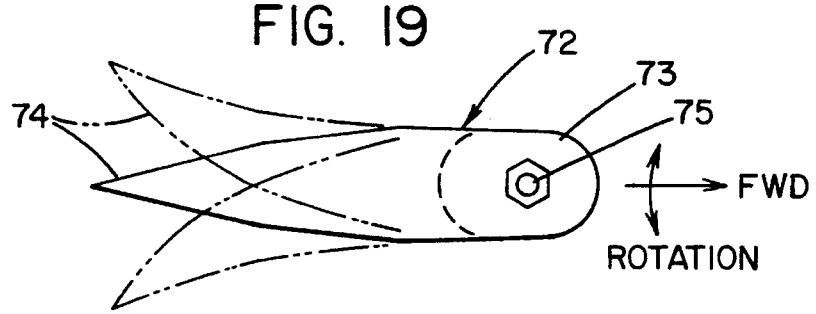
FIG. 19 is a plan view of the vane shown in FIG. 18.
Figure 20A:
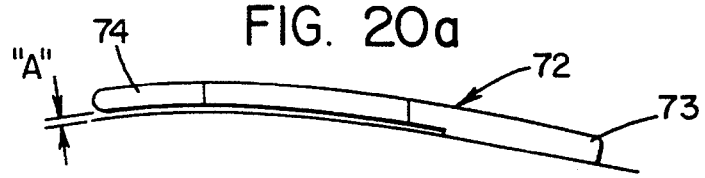
FIG. 20a is a side elevational view of the vane shown in FIG. 18.

A further modification of the invention is shown in FIGS. 18, 19 and 20 and which discloses a coupling cover designated 71. Cover 71 is substantially identical in construction and contour to the rotating coupling cover 30 described in the first embodiment of FIGS. 3 through 6 except that the vanes 72 on cover 71 are made from a flexible elastomeric compound that may have fabric reinforcing them or, if desired, a stiffening rib embedded therein to give the vane 72 some stiffness, yet permitting flexing thereof as shown in FIG. 19. Vanes 72 are in effect flexible vanes in comparison to the fixed vanes of the first embodiment (vanes 32). Vanes 72 are oblong in shape in plan view having a rounded forward end 73 and a rearwardly disposed tapering end 74. The forwardly disposed end 73 of vane 72 has a greater thickness than the remaining portion of the vanes to provide a clearance space indicated as "A" in FIG. 20 (as viewed in side elevation) to facilitate the deflection of the rearwardly disposed portion 74 to permit its pumping of water as the coupling cover 71 rotates in either direction. The forwardly disposed end portion 73 is suitably and firmly secured to the coupling cover, which in FIG. 19 is shown as a threaded bolt 75. More than one bolt may be used to assure the alignment of the vanes 72 on coupling cover 71. As in the other embodiments, the coupling cover 71 is encompassed by a fairwater 76 to provide an annular clearance space 77 for the passage of water between such fairwater 76 and the outer surface of coupling cover 71 to provide lubricant to the bearing assembly as previously described.

Figure 20B:
FIG. 20b is a side elevational view of the vane shown in FIG. 20a but with a portion broken away to show the elastomeric mounting.
Figure 21:
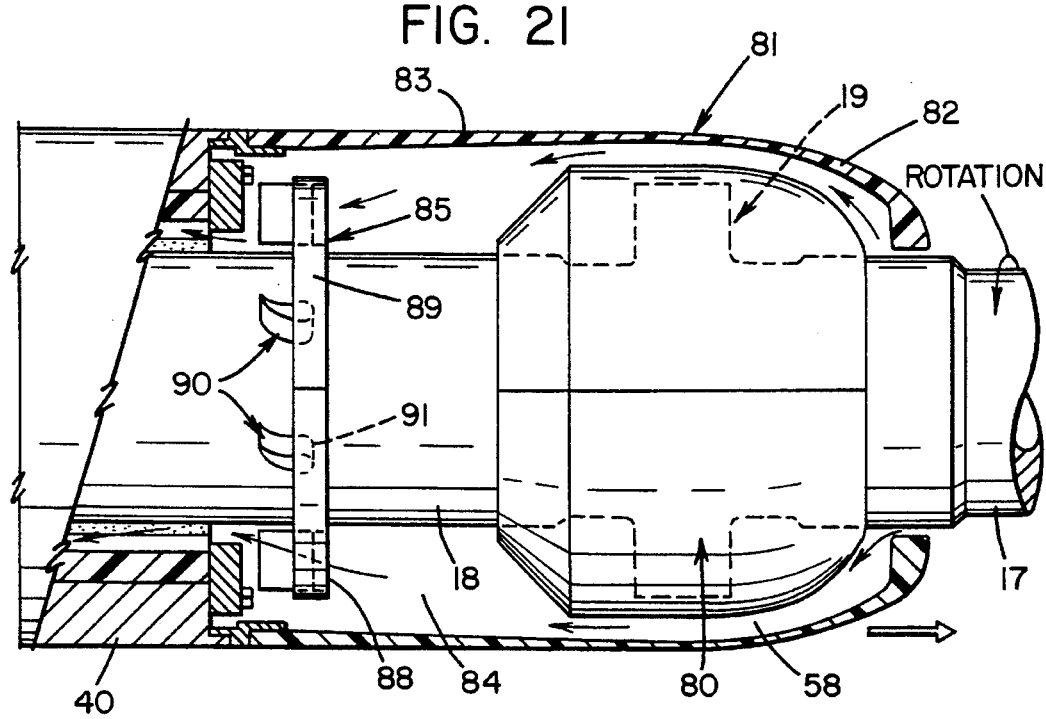
FIG. 21 is a side elevational view of a modified form of the pumping vanes mounted on an annular vane support located between a bearing assembly and a coupling cover.
Figure 22:
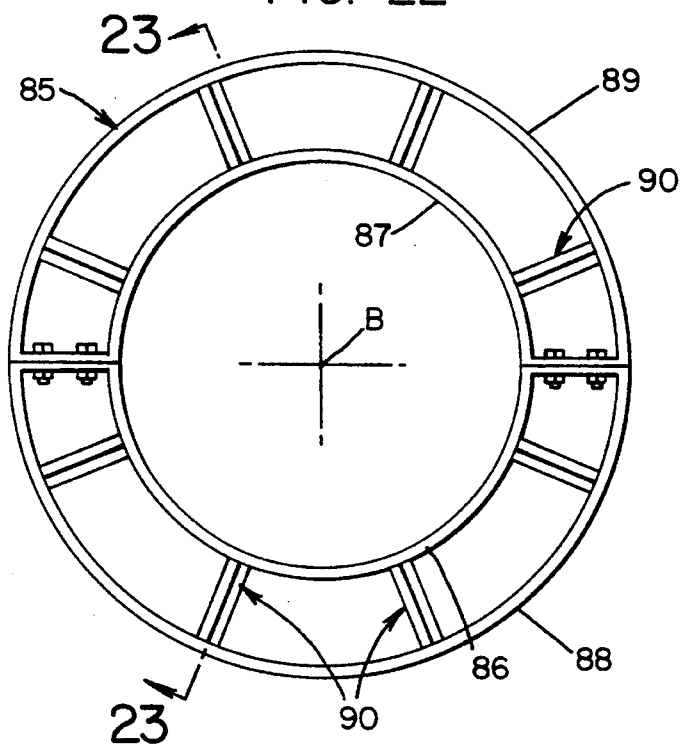
FIG. 22 is a front elevational view of the vanes and the annular vane support as depicted in FIG. 21.

A further modification of this invention would be to have the fins 72 of rigid material and have an elastomeric connection in lieu of the threaded bolt 75 to thus allow the rigid vane to yield at its elastomeric connection which in effect would act as a torsion spring as illustrated in FIG. 20b. The fin 72' is illustrated as secured to an elastomeric bushing 69 that is square in plan view, and which bushing 69 is bonded to a hex or square threaded bushing 70 to provide means for securing it to a coupling cover. The elastomeric bushing 69 with its interconnection to the coupling cover and the fin 72' acts as a torsion spring.

Figure 6:
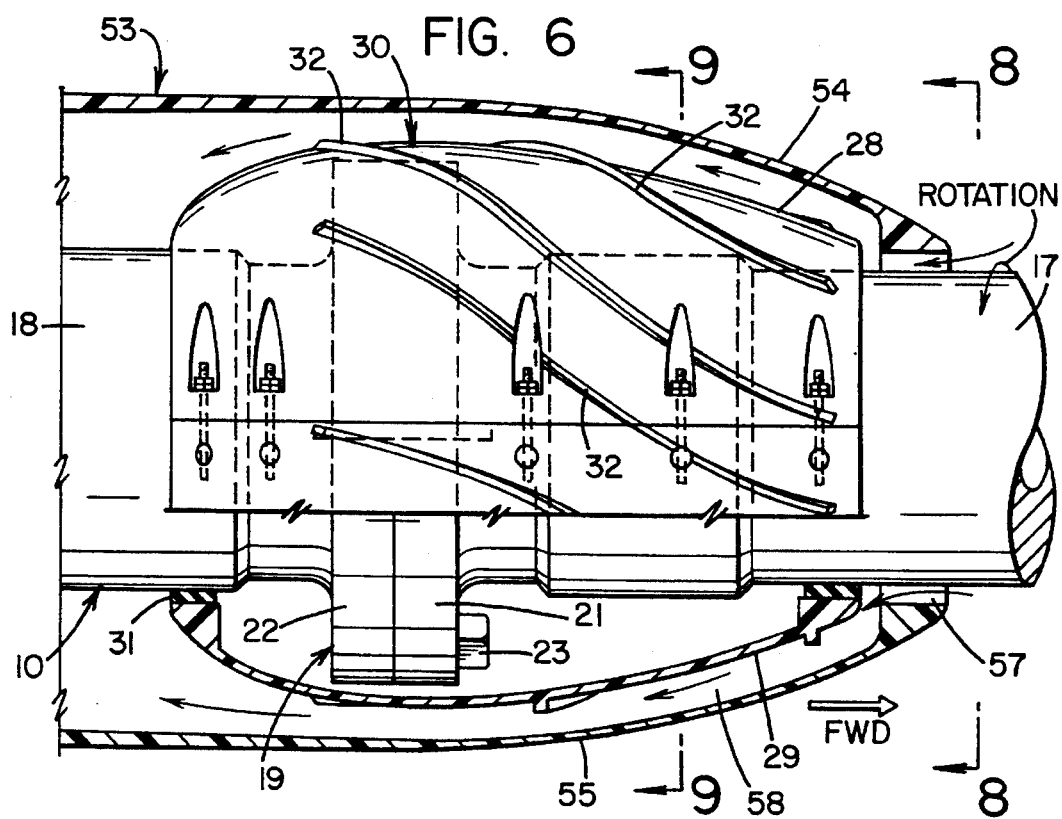
FIG. 6 is a cross-sectional view of the coupling cover and the outer shell as in FIG. 5 but with portions thereof in cross section and showing the vanes on the coupling cover taken on line 6—6 of FIG. 5.
Figure 23:
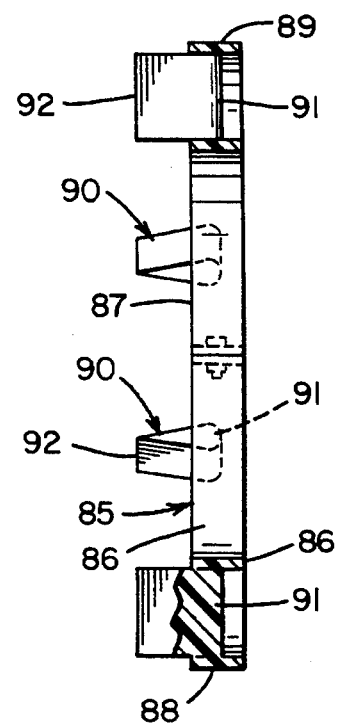
FIG. 23 is a cross-sectional view of the annular vane support taken on line 23—23 of FIG. 22.
Figure 27:
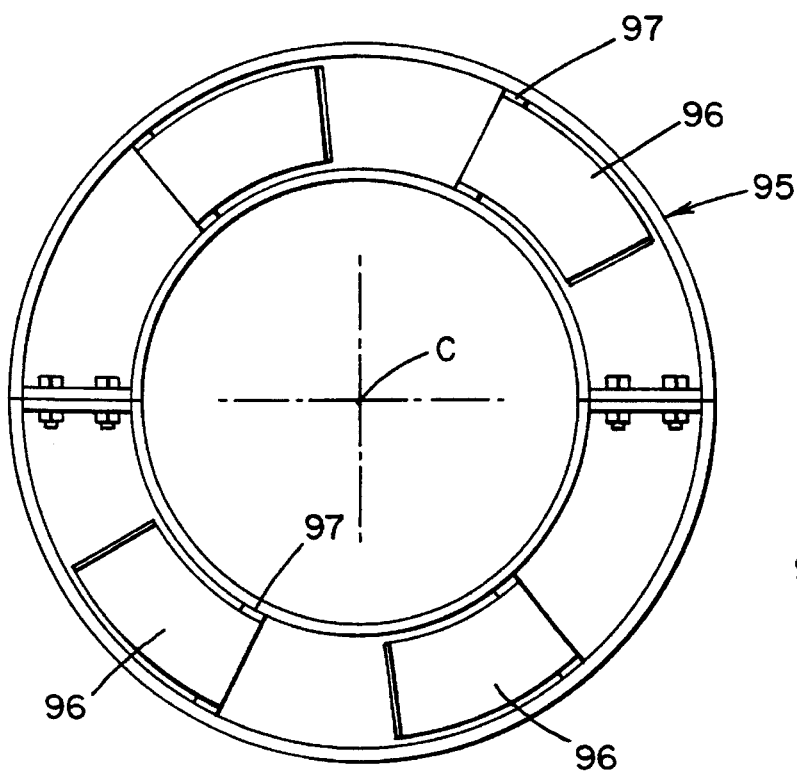
FIG. 27 is a front elevational view of the modified form of the pumping vanes mounted in an annular support.
Figure 28:
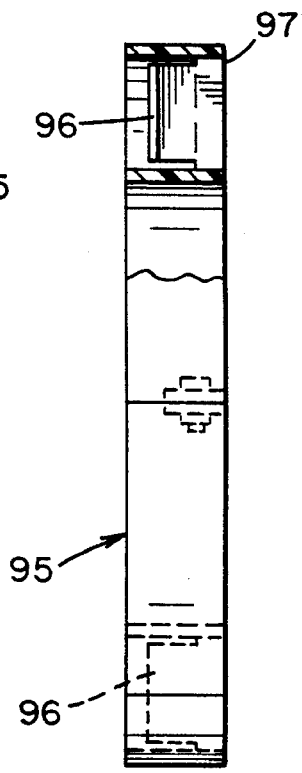
FIG. 28 is a side elevational view of the pumping vanes and annular support as shown in FIG. 27, with a portion of the annular support broken away.
Figure 29:
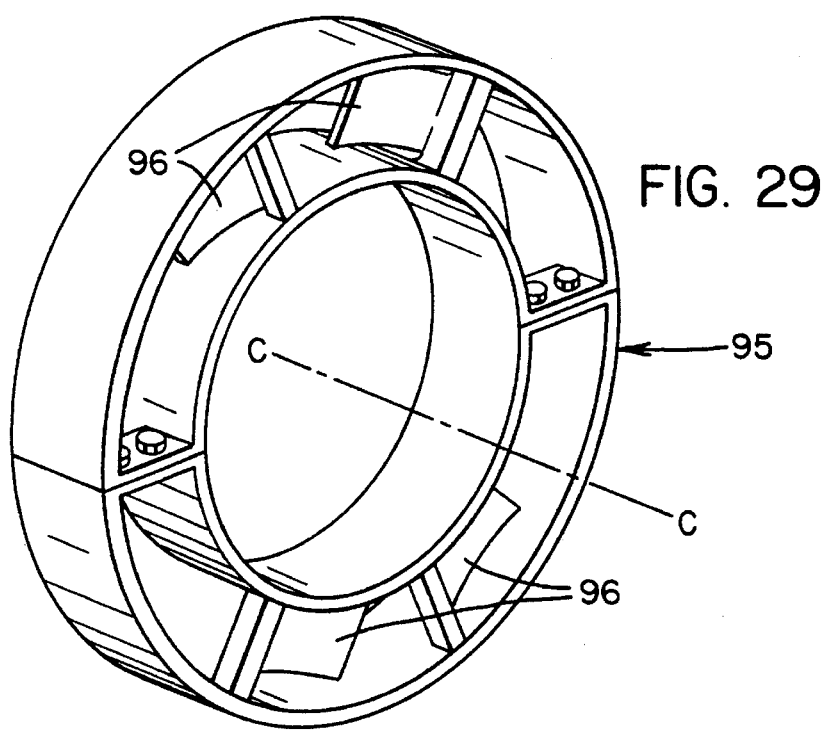
FIG. 29 is a perspective view of the annular support and pumping vanes of the embodiment as shown in FIGS. 26–28.

A further modification of the invention is shown in FIGS. 21 through 25, which discloses a coupling cover 80 similar in contour to the coupling cover 64 of FIG. 16 although any hydrodynamically contoured shape is contemplated including that of FIG. 6. Upstream of the coupling cover 80 is the bearing housing 40 containing its staves as previously described. Encompassing the coupling cover 80 and suitably attached to bearing housing 40 is a fairwater or outer shell 81 having a forwardly disposed hemispherical portion 82 and a longitudinally extending cylindrical portion 83 to define a chamber 84 therebetween. As in the previously described embodiments, the contour of the fairwater 81 follows the general contour of the coupling cover 80 to define an annular clearance space 58 therebetween to facilitate the flow of water into chamber 84 for lubricating the staves of the adjacent bearing assembly within bearing housing 40. In addition, the forwardly disposed end of hemispherical portion 82 closely encompasses the drive shaft to permit the flow of water into chamber 84. Located between bearing housing 40 and the coupling cover 80 is a hub 85, composed of two half sections containing inner rim portions 86, 87 and outer rim portions 88, 89. The inner rim half portions 86, 87 are secured to the outer rim half portions 88, 89 by radially extending members that are interconnected by suitable bolts to form such hub 85 that frictionally engages the outer peripheral surface of shaft section 18 to insure rotation therewith. A plurality of circumferentially spaced elastomeric vanes 90 are suitably secured between the inner rim portions 86, 87 and the outer rim portions 88, 89. The vanes 90 may be constructed of an elastomeric compound with or without fabric reinforcing elements to restrict the flexibility of their deflection. The cross-sectional plan view of each vane 90 has one end of a rounded configuration as at 91 whose respective sides taper to an apex 92. As seen in FIG. 23, the respective vanes in this embodiment are molded integrally with the inner and outer rim sections 86, 87 and 88, 89 respectively. In the normal stationary condition of such hub 85 as mounted on the shaft section 18, the vanes 90 have their apexes 92 disposed along planes that pass through the axial center line (designated B in FIG. 22). Thus as the shaft section 18 is rotated, the vanes will deflect to provide a pumping action to the water contained in the chamber 84 through the bearing assembly to lubricate the staves. Although FIG. 21 discloses the hub 85 with its vanes 90 located between the coupling cover 80 and the bearing housing 40, such hub 85 and its vanes 90 may be used where there is no coupling 19 and no need for a coupling cover 80 but only a fairwater or outer shell 83 and a bearing assembly and housing 40. Upon rotation of the shaft and the hub 85 in the normal manner to move the vessel or ship forward, the vanes will act as pumps to force flow the water to the staves in the bearing assembly. When the rotation of the shaft is reversed, these same vanes will act to pull the water through the bearing assembly.

A further modification of the invention is shown in FIGS. 26 through 29 which disclose a hub 95 similar in construction to that disclosed in FIGS. 18–23, which hub 95 has the two half sections joined together to facilitate its attachment to a drive shaft. In this embodiment, a plurality of circumferentially spaced pumping vanes 96 are suitably secured at one end to the hub 95 between an inner rim portion and an outer rim portion with the vanes lying generally within the structure of the hub such that in their normal condition the vanes are disposed in a circumferential plane that is normal to the axis of rotation of such hub 95, which axis is designated C in FIG. 27 and C—C in FIG. 29. Each vane has one end secured by a pin 97 to the hub 95 allowing the remaining portion of the vane 96 to deflect upon rotation of the drive shaft to which such hub is connected to and pumps water to the staves of a bearing unit with which it is associated with as described in the other embodiments.

Figure 30:
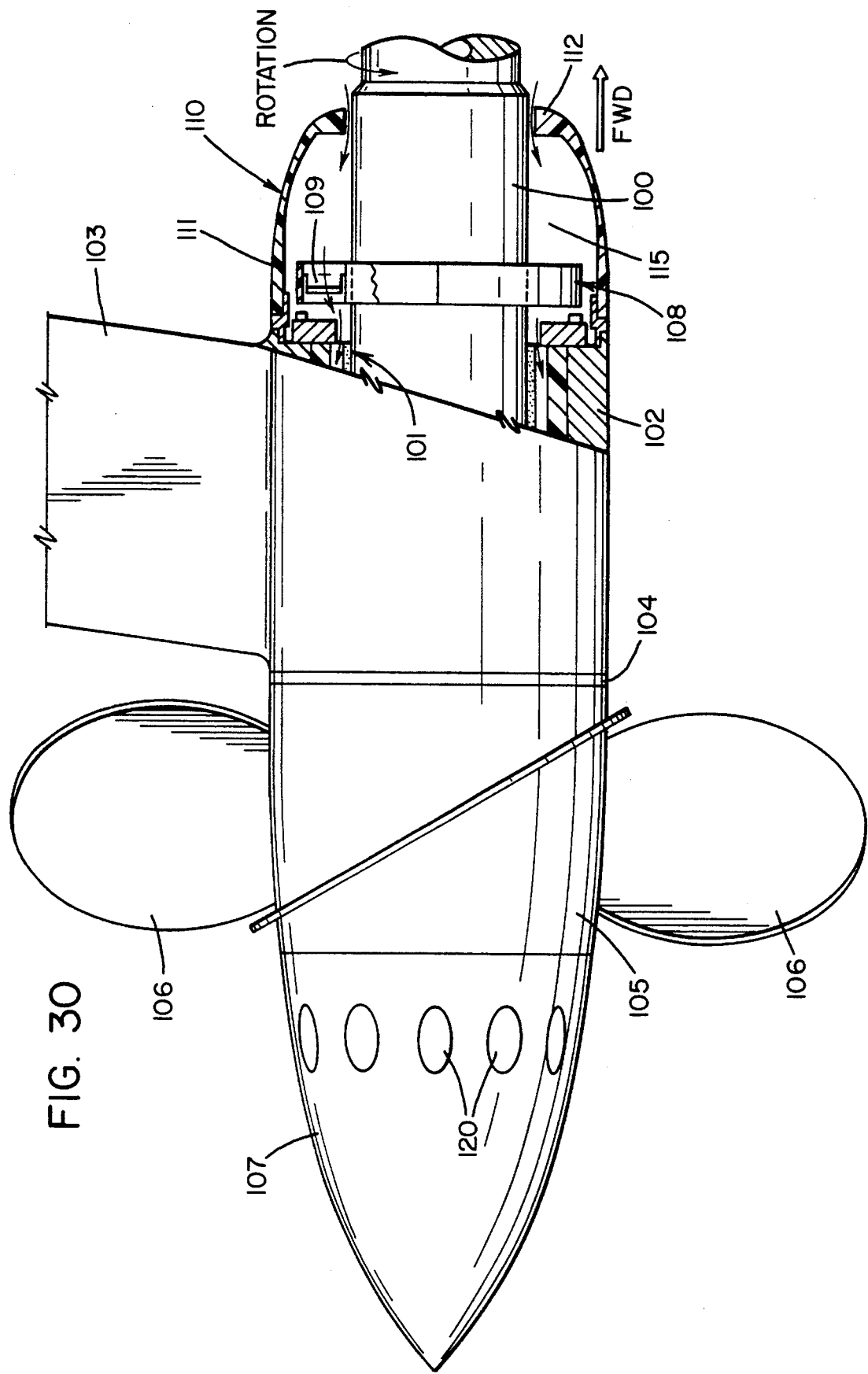
FIG. 30 is a side elevational view of a modified form of a pumping vane and support mounted between a bearing assembly and cover with the drive shaft connected to a propeller and with a rope guard adjacent thereto.

A further modification of the invention is shown in FIG. 30 which discloses a propeller or drive shaft 100 journaled in a bearing assembly 101 similar to that described above and disclosed by FIGS. 4, 7, 21 and 26, which bearing assembly has a strut barrel or housing 102 suitably supported by a strut 103. Mounted adjacent to the strut barrel 102 is a cylindrically shaped rope guard 104 secured to shaft 100 and mounted adjacent to rope guard 104 is a cylindrically shaped hub 105 with propeller blades 106 extending radially outwardly therefrom. Mounted on the end portion of shaft 100 and adjacent to hub 105 is a hemi-spherically shaped dunce cap 107 with a plurality of apertures 120 therein to facilitate the exiting flow of water from the bearing asembly 101. Secured to the shaft 100 is a hub 108 with vanes 109 identical to the previously described hub 85 and vanes 90 described above with respect to FIGS. 21 through 26 wherein vanes 109 pump water through the bearing assembly. A cover 110 encompasses the hub 108 and the portion of the shaft 100 adjacent thereto. One end 111 of cover 110 is suitably secured to the strut barrel 102 while the other end 112 closely encompasses the shaft 100 leaving a clearance space therebetween by which water enters into the chamber 115 defined by the outer surface of shaft 100, cover 110 and the bearing assembly 101. As shaft 100 rotates, the vanes 109 pump the water from chamber 115 through the bearing assembly 101 and out through the apertures 120.

In the above described pumping action by the elastomeric or resilient vanes, such vanes by their flexibility and restricted yielding in the hub that is attached to the rotating shaft will pump water in either direction of rotation of the drive shaft. Such vanes are especially applicable where water flow is needed as for lubricating a bearing even though the fairwater/coupling cover condition is not present, as where only a hub and its vanes are mounted adjacent to a bearing assembly.

Figure 31:
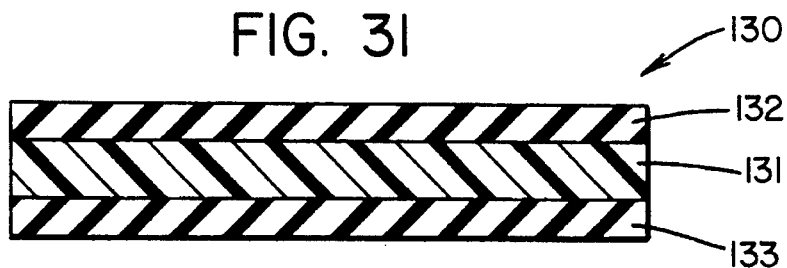
FIG. 31 is an enlarged view in cross section of a three layered composite structure.

The marine composite, or more particularly laminate, of the present invention is indicated generally at 130 and is shown in FIG. 31. Laminate 130 includes a fiber-reinforced toughened epoxy resin intermediate or core layer 131, sandwiched between elastomeric outer layers 132 and 133, respectively.

More specifically, with regard to intermediate layer 131, in general, modified or toughened epoxy resins which are additionally fiber-reinforced are preferred. The particular epoxy resin, modifier and reinforcement all are application-dependent. The various suitable epoxy resins and modifiers or toughening compounds therefor are well known to those of ordinary skill in the art. Examples of suitable fibrous reinforcements include aramids, aramid/carbon hybrids, carbon fibers, carbon/glass hybrids, ceramic fibers, glass fibers, metallic fibers, thermoplastic fibers, and the like.

A specific example of an epoxy resin useful in the present invention is one identified by the trade name "APCO" available from Applied Plastics Co., Inc. of 612 Franklin Ave., El Segundo, Calif. 90245. This epoxy resin has a specific gravity of 1.165 and its accompanying curing agent or hardener has a specific gravity of 1.809. The epoxy resin has a Shore D hardness of 84 at 25° C. and a glass transition temperature of 196° F. The viscosity of the epoxy resin is 2000 cps (1800±300), and the viscosity of the hardener is 410 cps (310±200). Another epoxy resin suitable for use in the present invention is "EVERFIX EPOXY RESIN" having a density of 8.5 lbs. per gallon. The hardener used with this epoxy resin is a modified aliphatic amine product available through Fibre Glass-Evercoat Co., Inc., 6600 Cornell Road, Cincinnati, Ohio 45242.

It is understood that the modified epoxy resin useful in forming marine laminate 130 of the present invention could be free of fiber-reinforcement without affecting the overall concept of the present invention. Moreover, intermediate layer 131 could be a polyester compound, again without affecting the concept of the present invention. It is also to be noted that intermediate layer 131 may be comprised of any polymer matrix composite, and need not be restricted to epoxy or polyester composites.

With regard to elastomeric outer layer 132, it generally is an elastomeric or viscoelastic vibration-dampening material as are well known in the art and to the literature. An example of a suitable vibration-dampening material is DEAD-BEAT®, which is available from The BFGoodrich Company of Akron, Ohio. It should be noted, however, that selection of a specific vibration-dampening material is dependent on the marine application for laminate 130.

Elastomeric outer layer 133 is an elastomer composition having slow-release biocidal properties as are well known to those of ordinary skill in the art. One suitable elastomeric biocidal composition useful in forming marine laminate 130 of the present invention is NOFOUL®, which also is available from The BFGoodrich Company of Akron, Ohio. A more complete description of a biocidal elastomeric composition is set forth in U.S. Pat. No. 3,639,583.

More specifically, the biocidal elastomeric compositions are special rubbery compositions in which both the concentration of biocidal toxicant dissolved therein, on the one hand, and the proportion of certain types of compounding ingredients and the state of cure or vulcanization on the other, are balanced or adjusted, as to provide, when vulcanized, a rubbery elastic matrix in which the organic toxicant remains appreciably soluble and sufficiently mobile as to diffuse to the surface of the composition at a rate at which it is removed from the surface and which is finite, low and selected for the intended biocidal application. Such surface toxicant is released to the environment, particularly in water, by molecular release.

Molecular release at low levels by means of these biocidal rubbers permit the use of many organic toxicants of known high biocidal activity, but which are known to hydrolyze or oxidize or which are easily absorbed or destroyed too rapidly to be useful for direct application. The rubber matrix holds such materials in solution and protects such toxicants until after release and, even through the biocidal activity of released material quickly dissipates, such is quickly renewed and sustained over long periods. By virtue of the biocidal rubbers, it is now possible to maintain very low toxicant levels over months and even years.

EFFECT OF COMPOUNDING INGREDIENTS

High structure (reinforcing) carbon blacks, petroleum waxes, and many of the other filler and lubricant type of ingredients normally added in the compounding of rubber have the effect of reducing the rate of diffusion of organic toxicants dissolved in the vulcanized matrix. In general, the biocidal rubbers contain lower levels of total compounding ingredients than those commonly employed in the same base elastomer intended for high stress, non-biocidal applications of the rubber. For example, whereas 40 to 100 parts/wt. or more of a high structure carbon black per 100 parts/wt. of base elastomer (hereinafter "phr.") commonly are utilized in such high-stress applications as automobile tire treads, the compositions of biocidal rubber will generally be below this level of carbon black, although the level required seems to be dependent mostly on the particular base elastomer, the degree of structure in the black itself, and the ability of the matrix to dissolve the particular toxicant in question. For example, neoprene rubber requires less carbon black for diffusion control than most other rubbers. Carbon black levels of from about 5 to about 35 phr. (more preferred from about 10 to about 35 phr.) seem to produce a very wide range of release rate with neoprene. Natural rubbers, SBR, nitrile rubbers and butyl rubbers, require somewhat more carbon black for low release rates. From about 30 to about 55 phr. seem required in the latter rubbers. EPDM rubber appears anomalous in requiring very high carbon black levels of from about 65 to about 100 phr. Not all carbon blacks are effective in controlling toxicant diffusion for we have found that only the higher structure carbon blacks (i.e., having oil absorptivities of 9 gals./100 lbs. or more) are effective. With carbon blacks of lower oil absorptivity (i.e., lower structure) it is not ordinarily possible to achieve low toxicant release (diffusion) rates at practical carbon black loadings. With the formulations which would require the higher carbon black levels, the use of from about 1 to about 7 phr. of petroleum wax is recommended since the proportion of carbon black can be reduced. It appears that with most elastomers and most toxicants from 5 to about 85 phr. of carbon black is a good practical operating range with from about 10 to about 55 phr. being more preferred. Toxicant loadings above about 10 phr. will usually require at least 20 phr. of carbon black and up to about 50 to 70 phr. for low toxicant release rates.

With the above proportions of carbon black and other compounding ingredients employed with most base rubbers, it follows that the biocidal elastomeric compositions will have a specific gravity at 25° C. greater than about 1.0. In antifouling applications and in many other biocidal applications where the rubber is supported or employed in an environment other than water, the effect of density of the rubber is of little moment. However, in many larvicidal applications carried out in water, these biocidal compositions will sink and this is an advantage in destroying snails (which move throughout a body of water) and other scavenger or bottom-favoring pests or larvae and in all larvicidal applications carried out in moving waters since the toxicant is and must be released throughout the body of water to be effective in such applications.

When it is desired to employ a toxicant loading which is above the intrinsic solubility of the toxicant in the matrix and/or difficulties in mixing are encountered due to such high toxicant loadings, a phenolic (i.e., phenol/formaldehyde) resin may be employed in the form of "microballoons" or "micro-spheres" to absorb and hold the excess toxicant. From about 20%/wt. to about 100%/wt. of the phenolic resin based on the weight of toxicant can be employed in this manner without undue loss of vulcanizate physical properties and while otherwise controlling the toxicant release rate. Even though bis(tributyl tin) oxide is soluble in neoprene rubber to the extent of only about 9 to 10%/wt. based on the raw rubber, the use of these amounts of microspheres makes it possible to employ up to 15 phr. or more of TBTO in neoprene with very little other changes in the recipe and with an effective biocidal life measured in years.

As indicated, petroleum waxes of the type normally employed in rubber compounding for lubricity and antioxidant activity have a relatively strong suppressing effect on toxicant diffusion or toxicant release rate. However, one is limited in the proportion of wax that can be incorporated into rubber by ordinary mixing techniques to the range of up to 7 phr. The use of from about 1.5 to about 5 phr. of such wax, in any given composition, will contribute very materially increased biocidal life to the composition. We employ both carbon black and wax in any formulations in which very long biocidal life is desired.

Other filler and/or lubricant-type compounding ingredients are of lesser effect than carbon black and wax but nevertheless reduce toxicant release at higher loadings and must be taken into account when designing a formulation. In general, total loadings, other than carbon black and wax, should be below about 20 phr.

Certain ingredients of sulfur vulcanization systems, notably the $C_{10}$ to $C_{18}$ fatty acids normally added as vulcanization accelerators and dispersants or normally present in the elastomer, apparently either react or cooperate in some manner with the organotin toxicants during vulcanization so that the biocidal activity and efficiency of the composition is relatively greater than can be attributed to the amount of original toxicant added. Of the fatty acid materials, lauric acid, palmitic acid, and oleic acid are very effective, with palmitic acid having greatest apparent activity. Laboratory bench scale tests have confirmed that bis(tributyltin) oxide reacts with these fatty acids. From about 0.5 to about 10 phr., more preferred from about 1 to about 8 phr., of these fatty acids are useful to secure increased biocidal activity with the organotin toxicants.

Both the more highly vulcanized biocidal rubbers and the corresponding unvulcanized forms thereof are of markedly lower biocidal effectiveness than are the specimens cured to intermediate levels of cure. The reason for this is not understood. Fortunately, high or highest biocidal activity for a given composition usually is obtained at a state of cure not too far removed from that known to produce optimum vulcanizate physical properties with the particular base rubber, compounding recipe and the vulcanization system employed. The state of cure is unaffected by the toxicant so that known vulcanization systems, techniques and equipment may be employed in the known manner to obtain the desirable state of cure for any given formulation.

The biocidal compositions useful in this invention may employ any of the known vulcanization systems including all of the sulfur vulcanization types, metal oxide cures, peroxide cures, amine cures, etc. It is preferred, to employ sulfur vulcanization systems because these are inexpensive, they are simple and well understood, and appear to offer the most desirable biocidal vulcanizates.

By the term "organic toxicant" is meant a toxicant compound carrying in its chemical structure sufficient of chemically-bound organic groups as to render the toxicant soluble to the extent of from about 0.01% to about 20%/wt. in the "organic vulcanizable elastomer", as the latter is defined below. More preferred toxicants have, in addition, low volatility in air and low solubility in natural waters. The toxicant should have a boiling point in excess of about 150° C. and most preferably in excess of about 200° C.

The preferred toxicants should have a solubility in natural waters (i.e., water containing some "hardness") below about 50 p.p.m., more preferably below about 30 p.p.m., and most preferably not more than about 2 to 10 p.p.m. The exact nature of the toxicant having these properties is not too important since the choice will be dictated primarily by the target pest to be killed, controlled or repelled.

Particularly effective toxicants are the organotin compounds of the formula $R_3SnX$ (see definition below), the nitrosalicylanilide compounds and their salts, the organophosphorus, and the chlorinated hydrocarbons.

In the formula $(R_3Sn)_nX$, n is a number from 1 to 3 (intermediate numbers indicate mixtures), R is an alkyl or aryl group and X is a substituent radical selected from the class consisting of sulfide, oxide, halogen such as chloride, bromide, and fluoride, chromate, sulfate, nitrate, hydroxide, acetate, fatty acid groups such as acetate, octanoate, laurate, neodecanoate, rosinate (or resinate), dimethyl dithiocarbamate, naphthenate, paravinyl benzoate, acrylate, methacrylate, iso-octylmercaptoacetate, hydride or methoxide. Preferred R groups are alkyl groups containing from 3 to 8 carbon atoms. The butyl group seems to maximize toxicity of the tin compounds. Preferred X groups are oxide, sulfide or a halogen. A particularly effective member of the latter preferred class is bis(tri-n-butyl tin) oxide ("TBTO"). Other highly effective compound is bis()tri-n-butyl tin) sulfide ("TBTS") and tributyl tin fluoride ("TBTF").

Typical examples of other organotin compounds useful in the biocidal rubber compositions are bis(tri-n-propyl tin) oxide, tri-n-propyl tin chloride ("TPTC"), triisopropyl tin chloride, bis(triamyl tin) oxide, triisobutyl tin chloride, tributyl tin acetate, tributyl tin chloride, triphenyl tin chloride, tributyl tin laurate, tributyl tin adipate ("TBTAd"), tributyl tin chromate bis(tributyl tin) maleate, tributyl tin neodecanoate, bis(tri-n-butyl tin) phthalate, amyl diethyl tin chloride, butyl dipropyl tin chloride, bis(tri-n-butyl tin) sulfate, phenyl dibutyl tin chloride, tributyl tin resinate ("TBTR"), tri-butyl tin isooctylmercaptoacetate, bis(tri-n-butyl tin) phosphite, triphenyl tin benzoate, tributyl tin dimethyl dithiocarbamate, the TBTO ester of 2-mercaptobenzothiazole, tributyl tin naphthenate, and others.

Another highly preferred class of toxicants for use in the biocidal rubber compositions are the salicylanilides and their derivatives including their alkali-metal and alkanol amine salts such as are described in U.S. Pat. Nos. 3,079,297, 3,113,067 and 3,238,098. One particular toxicant of this class known commercially as "Bayluscide" (TM Bayer) has been found particularly effective in the biocidal rubbers of this invention. The latter material is said to be the 2-aminoethanol salt of 5,2'-dichloro-4'-nitrosalicylanilide and has achieved at least provisionally acceptance by public health authorities in some countries.

The salicylanilide type toxicants most useful in the biocidal rubbers of this invention have the formula

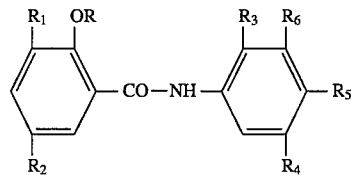

wherein R is hydrogen or a lower alkanoyl radical having 1 to 4 carbon atoms, $R_1$ is hydrogen or methyl, $R_2$ is a halogen such as chlorine, bromine or fluorine, $R_3$ and $R_4$ are hydrogen, methyl, or a halogen, or a nitro group, $R_4$, $R_5$ and $R_6$ are hydrogen, halogen or a nitro group and wherein always the compound contains only one nitro group and at most three halogen substituents.

Illustrative toxicants having the above formula are 5,2'-dichloro-4',5-chloro-4'-nitrosalicylanilide, 5-nitro-4'-chlorosalicylanilide, 5,3',5'-trichloro-2'-nitrosalicylanilide, 5,2', 5'-trichloro-3-methyl-4'-nitrosalicylanilide, 5,3'-dichloro-4'-nitrosalicylanilide, 5,4',6'-trichloro-2'-nitrosalicylanilide, 5'-dichloro-4'-nitrosalicylanilide, 5-bromo-2', 5,2',5'- trichloro-4-nitro-2-acetoxybenzanilide, 5,2'-dichloro-5'-trifluoro-methylsalicylanilide, and the alkali-metal and alkanolamine salts of the above and still other compounds of the above formula. Preferred nitrosalicylanilide compounds are the alkanolamine salts.

Organo-phosphorous compounds which may be employed are "Malathion" (O,O-dimethyl phosphorothioate or diethyl mercapto-succinate) (American Cyanamid Co.), "Dasanit" (Chemagro Corporation, Kansas City, Mo., a sulfinyl phosphorothioate $(C_2H_5O)_2PSOC_6H_4SOCH_3$); and others as set forth in U.S. Pat. No. 3,639,583.

In general, the biocidal rubber compositions may contain anywhere between about 0.02 to about 20 parts/wt. of toxicant per 100 parts/wt. of base elastomer in the composition(hereinafter "phr."). Where the upper limit exceeds the intrinsic solubility of the toxicant in the base elastomer, slightly increased proportions of carbon black, wax and/or other fillers and special additives (phenolic resin microspheres) can be employed to absorb and hold the excess toxicant. More practical concentrations are between about 0.2 to about 15 phr. of toxicant and for longest-lived biocidal effects between about 4 and about 12 phr. The concentration chosen will depend on the biocidal application and the biocidal longevity required. For antifouling applications of organotin toxicants, the concentration will usually be in the range of from about 1 to about 15 phr., with from about 4 to about 12 phr. being preferred. For larvacidal, algicidal, fungicidal and bacteriostatic applications the choice of concentration will cover almost the entire range depending on the application, although a generally effective range is from about 2 to about 12 phr.

Toxicant concentration can also be expressed in terms of the toxicant concentration released to the environment. For example, Bayluscide is said to exhibit a solubility in distilled water of 230 p.p.m.±50 (by weight) and less than this in hard waters. The organotin compounds usually exhibit a solubility below 50 p.p.m. in natural waters. As indicated, biocidally lethal concentrations usually are well below the water solubility level.

The term "vulcanizable organic elastomer" means any vulcanizable elastomer or rubbery material whose structural backbone consists of carbon-to-carbon chains, although such structure may contain non-hydrocarbon substituents (i.e., halogen and nitrile groups) or pendant groups (as contrasted with a silicone rubber having a backbone of O-Si-O repeating units); and which is vulcanizable or curable from the thermoplastic to the elastic condition.

By "vulcanizable to an elastomeric condition" is meant an ability of the rubber to be converted from a thermoplastic to an essentially elastic condition by any of the many mechanisms including, but not limited to, sulfur-vulcanization, metal-oxide curing systems, peroxide curing systems, amine curing systems, curing through metal-carboxylate linkages, and many others.

Thus, there may be utilized natural rubber, neoprene (polychloroprene) rubber; butyl (isobutylene/isoprene copolymer) rubber; SBR (stryene/butadiene rubbers); polybutadiene rubbers such as cis-polybutadiene rubber; synthetic polyisoprene rubbers such as cis-polyisoprene or synthetic natural rubber; nitrile rubbers (butadiene/acrylonitrile copolymers); ethylene/propylene copolymer rubbers; EPDM rubbers (ethylene/propylene/dicyclopentadiene and other ethylene/propylene/diene terpolymers); and others.

The miscibility or solubility of the organic toxicants such as organotin compounds and nitrosalicylanilide toxicants in the above (raw or uncompounded) rubers is appreciable, as will appear below:[1]

[1] (See U.S. Pat. No. 3,639,583)

| Rubber | Toxicant | Solubility percent/wt. |
|---|---|---|
| Neoprene | TBTO | 9.5 |
| DO | "Bayluscide" | 15+ |
| Natural | TBTO | 11 |
| DO | "Bayluscide" | 10 |
| SBR | TBTO | 7 |
| EPDM | TBTO | 8.5+ |
| Nitrile | | |
| 18% acrylo | TBTO | 15+ |
| 22% acrylo | TBTO | 12 |
| 26% acrylo | TBTO | 8+ |
| 33% acrylo | TBTO | 7+ |
| 40% acrylo | TBTO | 4+ |
| 52% acrylo | TBTO | 0.1 |

It should be noted that except for certain of the nitrile-type synthetic rubbers the solubility of these toxicants in all of the rubbers is between about 7% to about 15%/wt. With the nitrile rubbers toxicant solubility is adequate in the range of from about 15% to about 40%/wt. of combined acrylonitrile and rapidly decreases when the "bound" or combined acrylonitrile content of the copolymer exceeds the region of about 40%/wt.

The above and other similar elastomeric substances share common characteristics such as ability to accept carbon blacks, waxes, and fatty acids, they are sulfur-vulcanizable (although some respond also to other vulcanization systems), and they are strong and elastic when vulcanized. NOTE: Preferred rubbers for compositions intended for antifouling applications in seawater are neoprene, natural rubber, butyl and the nitrile rubbers containing not more than about 35%/wt., of combined acrylonitrile. Most preferred in compositions for use in antifouling applications is neoprene.

In biocidal rubber compositions, particularly for use in larvacidal applications in fresh water, preferred rubbers are neoprene, natural rubber, butyl rubber, SBR, and EPDM rubbers. Again, most preferred for this type of application is neoprene.

PREPARATION OF COMPOSITIONS

The compositions of these compositions may be prepared in conventional rubber mixing and processing equipment. In addition to the compounding ingredients referred to herein, the compositions should also include antioxidants, lubricants, accelerators and curatives, and other ingredients used for quality rubber vulcanizates in accordance with the rubber compounder's art. The elastomer is mixed in the usual fashion with the toxicant being added to the mixing batch at the time for addition of similar non-toxic rubber compounding ingredients. For example, the organotin compounds are supplied in the form of dry high melting powders which may be added at the same time as other dry and powdery compounding ingredients. Toxicants which are liquid or oily in consistency are added in the same fashion and at the same point in the mixing operation as are the ordinary lubricating and extender oils. Mixing may be carried out on two-roll rubber mills or in Banbury or other internal-type mixers. Once mixed, the composition may be sheeted off on a rubber mill or on a rubber calendar for use as sheets of antifouling rubber, or processed through an extruder as strips or tapes, or the output of the extruder fed to a pelletizer where it is cut, chopped or formed into pellets, or the stock formed into crude sheets and/or preforms for use in molding into the shapes and forms desired. The so-shaped rubber can then be vulcanized in an air or steam oven before use. The unvulcanized composition may be calendared or skim coated on fabric or other substrates to produce biocidal sheeting and fabrics for various protective uses.

Compositions for antifoulant use will be prepared as calendared sheets of uniform gauge or as formable putties which are then adhered by means of appropriate rubber-to-metal or other adhesives or, vulcanized directly to a variety of substrates such as metal plates, or as in the instant application to the intermediate layer 131 by a suitable cement or adhesive.

The biocidal elastomeric layer of approximately 0.05 inch in the composite structure maintains its surface free of barnacles, bryozoans, hydroids, algae, bugula, mussels and other fouling genera for over 7 years.

The anti-fouling properties of the above described materials is shown below.

EXAMPLE I

In this example, bis(tri-n-butyl) oxide ("TBTO") and "Neoprene WRT" (polychloroprene) are utilized in preparing a biocidal rubber composition of this invention. The compounding recipe is as follows:

| Material: | Parts/wt. |
| --- | --- |
| Neoprene WRT | 100.0 |
| FEF carbon black | 14.5 |
| PBNA[1] | 2.0 |
| ZnO | 5.0 |
| Lauric acid | 3.0 |
| MgO | 4.0 |
| Ethylene thiourea ("Na22") | 0.75 |
| Benzothiozyldisulfide (MBTS) | 1.0 |

[1]Phenyl beta-naphthylamine.

The above materials are mixed on a cold rubber mill by first milling the rubber until a sheet forms and then adding the other materials gradually while continuing the milling. To the above standard formulation are added varying amounts of TBTO added as an oily liquid. The latter disappears rapidly and is absorbed by the rubber qualities. The resulting compositions are vulcanized for 30 or 45 minutes at 300° F. in a sheet mold.

EXAMPLE II

In another warm water test off Miami, similar ⅛-inch panels containing 6 to 12 phr. of TBTO show very extended no-fouling life. In one such panel bis(tributyltin) sulfide (TBTS) is substituted for TBTO. Core type samples removed from such panels are analyzed for residual tin content as a basis for a "Predicted Foul-free Life". The data are:

| Toxicant | Phr. | Months foul-free at last report | Months predicted foul-free life |
| --- | --- | --- | --- |
| TBTO | 7 | 35 | 50 |
| TBTO | 6.5 | 39 | 55 |
| TBTO | 7 | 39 | 55 |
| TBTS | 7 | 40 | 60 |
| TBTO | 12 | 40 | 70 |

These results exceed the best performance of the best antifouling paints by a factor of 4 to 6 or more and at organotin loadings ⅕ to ⅓ those of the paints.

As indicated above, antifouling life predictions are based on residual tin analyses. Below are shown a typical series of analyses on one neoprene panel which contained about 12 phr. of TBTO (corresponds to 3.52%/wt. of tin, as tin); the data are:

| Months immersed | Percent/wt. residual tin |
| --- | --- |
| 0 | 3.52 |
| 1 | 2.46 |
| 2 | 2.11 |
| 3 | 1.77 |
| 30 | 0.81 |

Barnacles begin to attach when the residual tin concentration falls to about 0.04 to 0.05%/wt. Algae growth commences when the residual tin content has fallen to about 0.1%/wt.

EXAMPLE III

Panels prepared each having an adhesively-secured layer ¹⁄₁₆ inch thick of a neoprene/TBTO formulation similar to that of the recipe given in Example I (6.5 phr. TBTO) except for the use of varying proportions of a petroleum wax. The rubber sheets are cured 45 minutes at 300° F. The data obtained on immersion off Miami are as follows:

| Code | Wax[1] Loading | Months to appearance of: | | Foul-free life[2], mos. |
| --- | --- | --- | --- | --- |
| | | Algae | Barnacles | |
| 105B | None | 32 | 39 | 39 |
| 311A | 2 | 38 | — | 45 |
| 373B | 5 | 38 | — | 55 |
| 373C | 2 | 38 | — | 58 |
| 373D | 2 | 38 | — | 58 |

[1]Antisun wax, specific gravity = 0.92.
[2]By residual tin analysis.

The use of 2 to 5 phr. of wax is seen to exhibit a rather strong effect on the foul-free life. A foul-free life of nearly five years in subtropical coastal waters is at least three times or more better than that of the very best anti-fouling paints.

EXAMPLE IV

In a similar fashion, panels are prepared based on natural rubber and employing TBTO or TBTS. The general recipe and cure cycle employed is:

| Material | Phr. |
| --- | --- |
| Natural rubber | 100 |
| HAF carbon black | 40 |
| PBNA | 1 |
| ZnO | 5 |
| Stearic acid | 3 |
| MBTS | 0.6 |
| Sulfur | 2.5 |

The material is cured for 15 minutes at 307° F. in the form of sheets 6"×0.075" which are adhered with adhesive to polyvinyl chloride substrates to insure contact of only one surface with sea water. Immersion was off Miami, Fla., for 35 months. The data obtained are:

| Toxicant | | | Month to (average 2 to 6 panels) | | | |
| --- | --- | --- | --- | --- | --- | --- |
| Code | Type | Phr. | 1% algae | 1 barnacle | 50 barnacles | CF |
| B1 | TBTO | 0 | 1 | 1 | 1 | 1 |
| B2 | TBTO | 1 | 11 | 13 | 15 | 18 |
| B3 | TBTO | 3 | 18 | 16 | 20 | 21 |
| B4 | TBTO | 5 | 26 | 22 | 24 | 28 |
| B5 | TBTS | 8 | 26 | 26 | — | — |
| B6 | TBTS | 2 | 8 | 11 | 19 | 19 |
| B7 | TBTS | 4 | 20 | 18 | 21 | 23 |
| B8 | TBTS | 6 | 20 | 22 | 23 | 23 |
| B9 | TBTS | 8 | 21 | 29 | — | — |

The above data indicate that natural rubber compounds lose toxicant relatively faster than does neoprene and the use of about 50 phr. of carbon black and/or 2 to 5 phr. of wax would slow such loss and produce longer-lived antifouling coatings. Of the panels remaining on test after 35 months, those containing 10 phr. of TBTS appear to be very good antifouling materials. Nevertheless, the panels containing 5 to 6 phrs. or more of either toxicant are good for approximately 2 years or more under extremely severe semi-tropical coastal fouling conditions.

For other examples reference may be made to U.S. Pat. No. 3,639,583.

Figure 32:
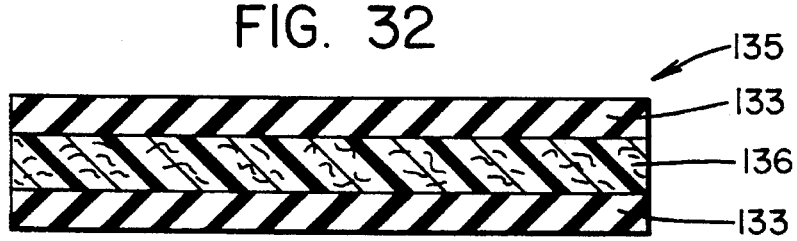
FIG. 32 is a modification of the three layered composite structure of FIG. 31.

Laminate 130 typically will be used in marine applications wherein elastomeric outer layer 133 having biocidal properties will be directly exposed to the marine environment, and more particularly seawater, while elastomer outer layer 132 has vibration-dampening properties. It is understood that although laminate 130 preferably is comprised of a fiber-reinforced toughened epoxy resin intermediate layer sandwiched between an elastomeric biocidal composition layer and an elastomeric vibration-dampening material layer, other variations of this basic structure are possible. More particularly as shown in FIG. 32, laminate 135 could be comprised of a fiber-reinforced toughened epoxy resin intermediate or core layer 136 sandwiched between a pair of biocidal elastomeric composition layers 133, which would still provide laminate 135 with vibration-dampening properties due to the elastomeric base of the outer layers. Moreover, in any of the above-discussed layer combinations, a polyester layer could be substituted for the fiber-reinforced toughened epoxy resin intermediate layer.

The laminate 130 and 135 of the present invention as discussed above is formed in the following manner. The selected fiber-reinforced and toughened epoxy resin intermediate layer preferably is in the form of a plied prepreg, that is, the fibrous reinforcement is preimpregnated with the modified epoxy resin. The number of plies of the prepreg is dependent on the specific marine end use. The prepreg then is coated on both sides by any suitable means with a primer which improves the compatibility between the epoxy resin intermediate layer 131 and elastomeric layers 132 and 133. Such primers or tiecoats for improving the compatibility between generally dissimilar materials are well known to those of ordinary skill in the art, with a preferred primer being CHEMLOK®, which is available from the Lord Corporation of Erie, Pa. The ingredients of CHEMLOK® are as follows: containing 50% by weight of Xylene (commonly known as Xylol), 25% by weight of trichloro ethylene (commonly referred to as TCE), 5% carbon black, and 1% carbon tetrachloride. The primed epoxy resin intermediate layer 131 then is sandwiched between the elastomeric biocidal composition layer 133 and the elastomeric vibration-dampening layer 132. The composite then is co-cured in an autoclave at a temperature of from about 250° F. to about 350° F., desirably from about 280° F. to about 310° F., and preferably at about 300° F., and at a pressure of from about 50 psi to about 140 psi, desirably from about 75 psi to about 120 psi, and preferably at about 100 psi. The above-described process causes a mechanical bond to form between intermediate epoxy resin layer 131 and each of elastomeric outer layers 132, 133. Moreover, we believe that the primer compound promotes possible chemical cross-linking between intermediate epoxy resin layer 131 and each of the elastomeric layers 132 and 133.

It is understood that the thickness of each of the layers of marine laminate 130 or 135 depends on the application in which the composite is being utilized, and can be varied without affecting the concept of the present invention.

Figure 33:
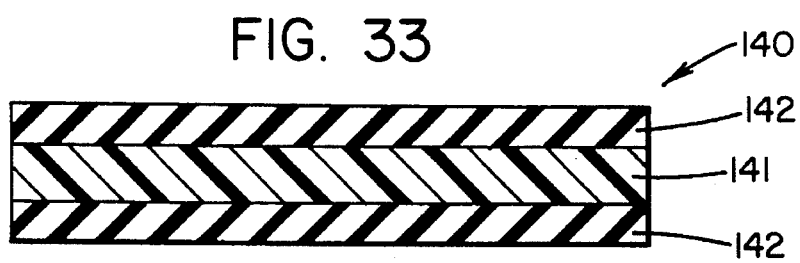
FIG. 33 is a three layered composite structure similar to that of FIG. 31 but with the intermediate layer being a fiber-reinforced epoxy resin.

The laminate 140 of the invention shown in FIG. 33 comprises a fiber-reinforced toughened epoxy resin intermediate layer 141 sandwiched between a pair of elastomeric outer layers 142 of viscoelastic vibration-dampening materials such as DEADBEAT® described above.

Figure 34:
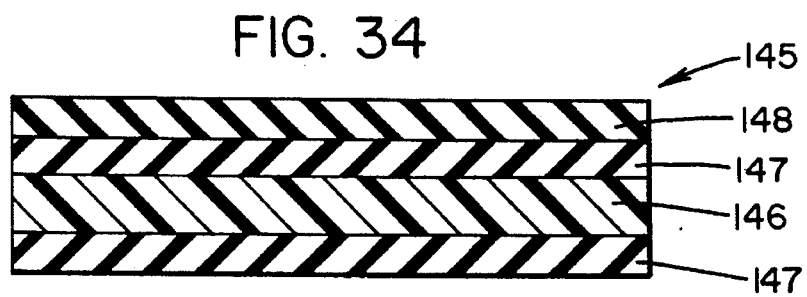
FIG. 34 is a further modification of the composite structure shown in FIG. 33 but with a biocidal layer on one of the outer elastomeric layers.

A further modification of the laminate is shown in FIG. 34 wherein the laminate 145 comprises a fiber-reinforced toughened epoxy resin intermediate layer 146 sandwiched between two elastomeric layers 147 of viscoelastic vibration-dampening materials such as DEADBEAT® described above. An elastomeric outer layer 148 having biocidal properties is suitably adhered to one of the layers 147 to provide a laminate that exhibits the properties of ensuring greater vibration dampening means while assuring the prevention of a build-up of marine life.

Figure 35:
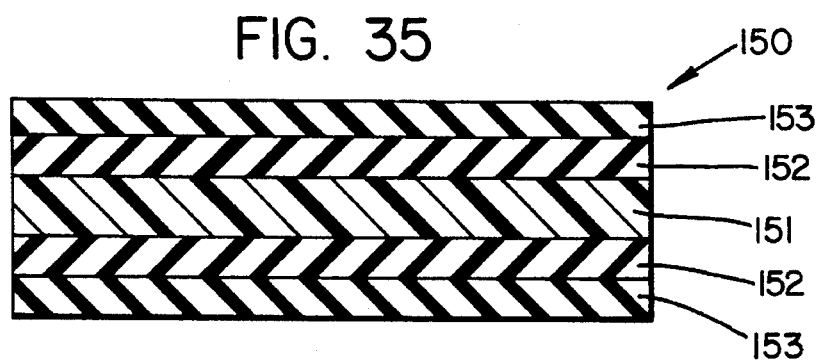
FIG. 35 is a further modification of the composite structure shown in FIG. 32 but with a biocidal layer on both outer elastomeric layers.

A further modification of the laminate is shown in FIG. 35 wherein the laminate 150 comprises a fiber-reinforced toughened epoxy resin intermediate layer 151 sandwiched between two elastomeric layers 152 of viscoelastic vibration-dampening materials such as DEADBEAT™ described above. A pair of elastomeric outer layers 153 having biocidal properties as described above are suitably adhered to the outer surfaces of the layers 152 to provide a laminate that exhibits maximum vibration dampening properties while also containing maximum anti-fouling properties. The respective laminates 135, 140, 145, and 150 are prepared as described above with respect to laminate 130. In all of these examples, the fiber-reinforced epoxy resin layers may be non-fiber-reinforced.

It will be apparent that, although a specific embodiment and certain modifications of the invention have been described in detail, the invention is not limited to the specifically illustrated and described constructions since variations may be made without departing from the principles of the invention.

What is claimed is:

1. A housing for use in a marine vessel, said housing having a shell with a composite moldable structure, said composite structure having at least three layers, one of said layers is a polymer matrix composite rigid layer, and a said polymer matrix composite layer being sandwiched between a pair of outwardly disposed elastomeric layers, wherein one of said elastomeric layers is a biocidal elastomeric composition layer, and the other one of said elastomeric layers is a vibration damping material layer.

2. A housing for use in a marine vessel, said housing having a shell with a composite moldable structure, said composite structure having at least three layers, one of said layers is a polymer matrix composite rigid layer, and said polymer matrix composite layer being sandwiched between a pair outwardly disposed elastomeric layers, wherein said elastomeric layers are biocidal elastomeric composition layers.

3. A housing for use in a marine vessel, said housing having a shell with a composite moldable structured said composite structure having at least three layers, one of said layers is a polymer matrix composite rigid layer, and said polymer matrix composite layer being sandwiched between a pair of outwardly disposed elastomeric layers, wherein a biocidal elastomeric composition layer is secured to each of said elastomeric layers.

4. A housing for use in a marine vessel, said housing having a shell with a composite moldable structure, said composite structure having at least three layers, one of said layers is a polymer matrix composite rigid layer, and said polymer matrix composite layer being sandwiched between a pair of outwardly disposed elastomeric layers, wherein a layer of biocidal elastomeric composition layer is secured to one of said elastomeric layers.

5. A housing for use in a marine vessel, said housing having a shell with a composite moldable structure comprised of a polymer matrix composite rigid layer sandwiched between a pair of outwardly disposed elastomeric layers, said polymer matrix composite layer being comprised of a polymer matrix from the group consisting of epoxy resin and polyester.

6. A housing for use in a marine vessel, said housing having a shell with a composite moldable structure, said composite structure being comprised of a polymer matrix composite rigid layer sandwiched between a pair of outwardly disposed elastomeric layers, said polymer matrix composite rigid layer having a shore D hardness on the order of 84.

* * * * *